(12) United States Patent
Cherukuri et al.

(10) Patent No.: US 8,862,883 B2
(45) Date of Patent: Oct. 14, 2014

(54) SYSTEM AND METHOD FOR SECURE CLOUD SERVICE DELIVERY WITH PRIORITIZED SERVICES IN A NETWORK ENVIRONMENT

(75) Inventors: Sunil Cherukuri, Morrisville, NC (US); Mohamed Khalid, Cary, NC (US); Brian Cinque, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 13/473,418

(22) Filed: May 16, 2012

(65) Prior Publication Data

US 2013/0311778 A1 Nov. 21, 2013

(51) Int. Cl.
*H04L 9/32* (2006.01)
*H04L 29/06* (2006.01)
*H04L 9/08* (2006.01)

(52) U.S. Cl.
CPC ........... *H04L 63/0272* (2013.01); *H04L 9/0838* (2013.01)
USPC .............................. 713/171; 726/15; 713/151

(58) Field of Classification Search
CPC ..... H04L 2209/80; H04L 63/08; H04L 63/10; H04L 9/083; H04L 63/0272; H04L 9/32; H04L 63/20; H04L 63/164; H04L 63/029; H04L 63/04; H04L 63/061; H04L 63/062; H04L 12/4641; H04L 63/0869; H04W 12/06; H04W 12/04
USPC .................. 713/170, 171, 151; 726/11–15, 4; 380/277, 278; 718/105
See application file for complete search history.

(56) References Cited

U.S. PATENT DOCUMENTS

| | | | |
|---|---|---|---|
| 8,261,318 B2 * | 9/2012 | Huang et al. ...................... 726/1 |
| 8,423,631 B1 * | 4/2013 | Mower et al. ................. 709/223 |
| 8,544,080 B2 * | 9/2013 | Arauz Rosado ................ 726/15 |
| 2005/0088977 A1 | 4/2005 | Roch et al. |
| 2007/0248091 A1 * | 10/2007 | Khalid et al. .................. 370/392 |
| 2009/0122990 A1 * | 5/2009 | Gundavelli et al. ........... 380/278 |
| 2009/0199290 A1 * | 8/2009 | McCullough et al. .......... 726/12 |
| 2010/0088150 A1 * | 4/2010 | Mazhar et al. .................. 705/10 |
| 2013/0138816 A1 * | 5/2013 | Kuo et al. ...................... 709/226 |
| 2013/0219476 A1 * | 8/2013 | Lin et al. ............................. 726/4 |
| 2013/0227089 A1 * | 8/2013 | McLeod et al. ............... 709/220 |

OTHER PUBLICATIONS

Cisco, "Cisco Intelligent Automation for Cloud," Data Sheet, ©2011, 9 pages; http://www.cisco.com/en/US/prod/collateral/netmgtsw/ps6505/ps11869/data_sheet_c78-678564.html.

(Continued)

*Primary Examiner* — Nirav B Patel
(74) *Attorney, Agent, or Firm* — Patent Capital Group

(57) ABSTRACT

An example method includes receiving a request for a cloud capability set during an Internet Key Exchange negotiation associated with a virtual private network (VPN) tunnel between a subscriber and a cloud, wherein the cloud capability set comprises one or more cloud capabilities, mapping the request to one or more cryptographic modules that can support the cloud capability set, and offloading the VPN tunnel to the one or more cryptographic modules. The request can be an Internet Security Association and Key Management Protocol (ISAKMP) packet listing the one or more cloud capabilities in a private payload. The method may further include splitting the VPN tunnel between the cryptographic modules if no single cryptographic module can support substantially all the cloud capabilities in the cloud capability set. In some embodiments, the request is compared with a service catalog comprising authorized cloud capabilities.

18 Claims, 10 Drawing Sheets

(56) References Cited

OTHER PUBLICATIONS

Jeff Hine and Bob Laliberte, "Enabling IT-as-a-Service," Sep. 2011, 11 pages.
Cisco, "MDS 9000 Family Fabric Manager Configuration Guide, Chapter 29 (IPsec and IKE)," Oct. 2005, 18 pages; http://www.cisco.com/en/US/docs/storage/san_switches/mds9000/sw/rel_2_x/fm/configuration/guide/ipsec.pdf.
Cisco, "Cisco Virtualized Multi-Tenant Data Center, Version 2.0 Large Pod Design Guide," Nov. 2010, 80 pages; http://www.cisco.com/en/US/docs/solutions/Enterprise/Data_Center/VMDC/2.0/large_pod_design_guide/Large_Pod_Design_Guide.pdf.
D. Maughan, et al., "Internet Security Association and Key Management Protocol (ISAKMP)," Network Working Group, RFC 2408, Nov. 1998, 87 pages.
Cisco Systems, Inc., Configuring Security for VPNs with IPsec, Mar. 2011, 44 pages.
Open Data Center Alliance, Inc., "Open Data Center Alliance Usage: Service Catalog" ©2011, 16 pages http://www.opendatacenteralliance.org/document-sections/category/71-docs?download=445%3Aservice-catalog.
Cisco, "Cisco Secure Network Container: Multi-Tenant Cloud Computing," ©2010, 6 pages http://www.cisco.com/en/US/solutions/collateral/ns340/ns517/ns224/ns955/ns957/white_paper_c11-636984_ns1103_Networking_Solutions_White_Paper.html.

* cited by examiner

SYSTEM AND METHOD FOR SECURE CLOUD SERVICE DELIVERY WITH PRIORITIZED SERVICES IN A NETWORK ENVIRONMENT

TECHNICAL FIELD

This disclosure relates in general to the field of communications and, more particularly, to a system and a method for secure cloud service delivery with prioritized services in a network environment.

BACKGROUND

Recent advances in networking technology have enabled delivery of information technology (IT) as a service (ITaaS). Features like cloud computing and virtualization have enabled enterprises to provide on-demand computing resources in a shared, self-serve model with a catalog of standardized service options. Policy based controls and orchestration to manage internal and external computing resources have enabled a seamless delivery of ITaaS. In such network environments, operating models and architecture can closely resemble a service provider environment even within an enterprise network. Thus, on-demand cloud computing can provide service providers and enterprises the ability to provision new services in minutes instead of weeks, rapidly scale infrastructure, and meter usage, resulting in enhanced IT service delivery, while driving down both operational and capital costs.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes receiving a request for a cloud capability set during an Internet Key Exchange (IKE) negotiation associated with a virtual private network (VPN) tunnel between a subscriber and a cloud, mapping the request to one or more cryptographic modules that can support the cloud capability set, and offloading the VPN tunnel to the one or more cryptographic modules. The cloud capability set may include one or more cloud capabilities. In more specific embodiments, the method may further include receiving another request for another cloud capability set during another IKE negotiation associated with another VPN tunnel between another subscriber and the cloud. This cloud capability set can be different from the previous cloud capability set. The method may include mapping that request to other cryptographic modules, and offloading the other VPN tunnel to the other cryptographic modules.

Example Embodiments

Figure 1:
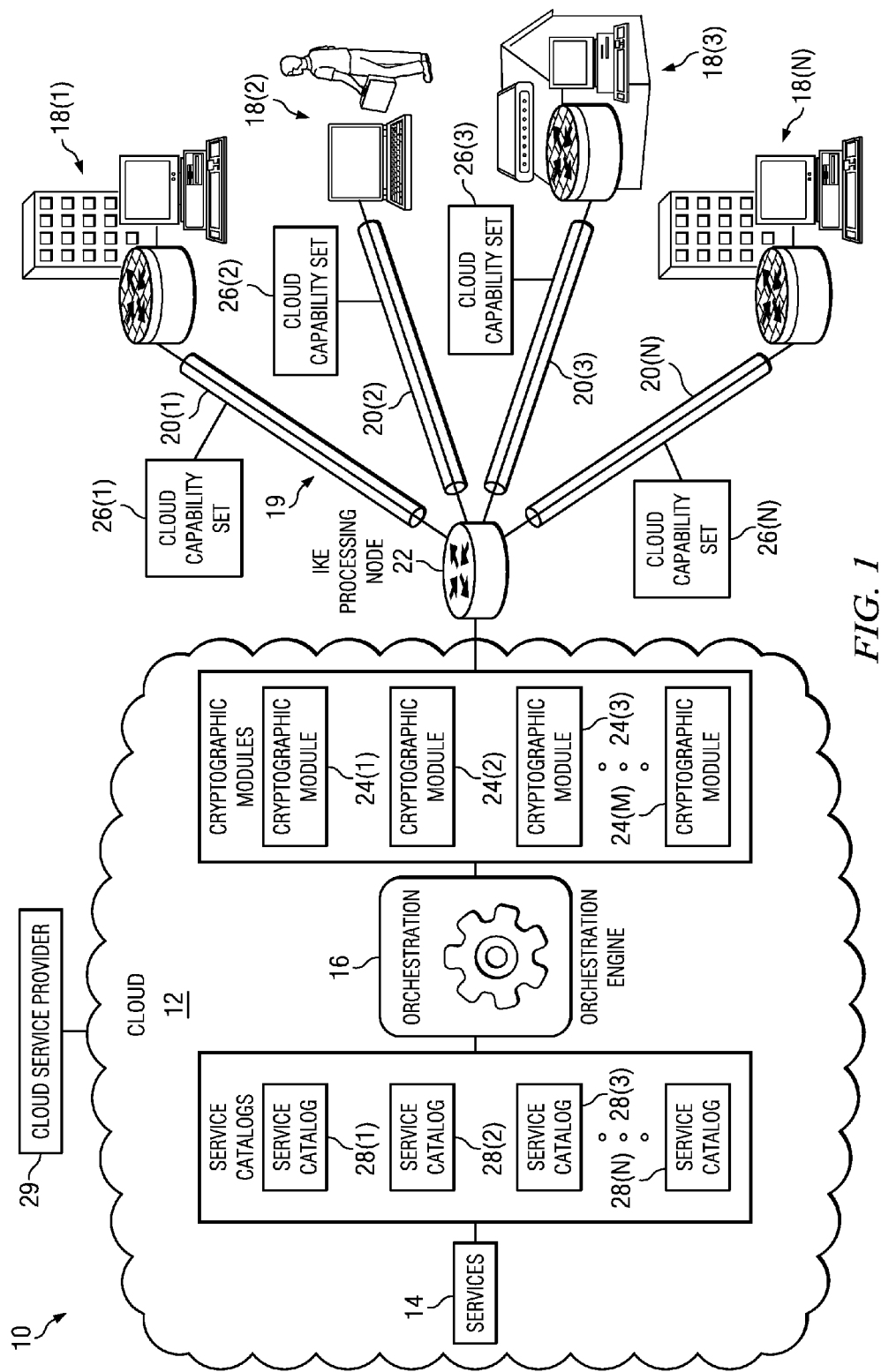
FIG. 1 is a simplified diagram of one embodiment of a communication system in accordance with the present disclosure.

Turning to FIG. 1, FIG. 1 is a simplified block diagram of a communication system 10 for providing secure cloud service delivery with prioritized services in a network environment in accordance with one embodiment of the present disclosure. FIG. 1 illustrates a cloud 12, which can provide services 14 through an orchestration engine 16 to one or more subscribers 18(1)-18(N) over a network connection 19. The general term 'cloud' can include any type of network, infrastructure, or set of systems that may be associated with the delivery of computing and storage capacity for any number of end users or for network devices. For example, an end user (or a network device) can access a cloud-based application through a web browser, a mobile app, a tunnel, etc., while the business software and data can be stored on servers at a remote location.

Subscribers 18(1)-18(N) may connect to cloud 12 through respective virtual private network (VPN) tunnels 20(1)-20(N). An Internet Key Exchange (IKE) processing node 22 may offload VPN tunnels 20(1)-20(N) to one or more cryptographic modules 24(1)-24(M) based on respective cloud capability sets 26(1)-26(N) of VPN tunnels 20(1)-20(N). IKE processing node 22 may enable secure delivery of services 14 to subscribers 18(1)-18(N) in a prioritized manner according to the subscribers' service options in respective service catalogs 28(1)-28(N).

Cloud 12 can include a collection of hardware and software that forms a shared pool of configurable computing resources (e.g., networks, servers, storage, applications, services, etc.), which can be suitably provisioned to provide on-demand self-service, network access, resource pooling, elasticity and measured service, among other features. Cloud 12 may be deployed as a private cloud (e.g., infrastructure operated by a single enterprise/organization), community cloud (e.g., infrastructure shared by several organizations to support a specific community that has shared concerns), public cloud (e.g., infrastructure made available to the general public), or a suitable combination of two or more disparate types of clouds. Cloud 12 may be managed by a cloud service provider 29, who can provide subscribers 18(1)-18(N) with at least access to cloud 12, and authorization to set up respective VPN tunnels 20(1)-20(N) in accordance with predetermined service level agreements (SLAs).

Services 14, which include computing capabilities (e.g., processors, memory, server time, network storage, etc.), may be delivered to subscribers 18(1)-18(N) by orchestration engine 16, which is an application deployed on cloud 12. Orchestration engine 16 can enable automation of order-to-delivery, service management, and assurance instantiation, among other features. Any number and variety of subscribers 18(1)-18(N) may connect to cloud 12 to access services 14 within the broad scope of the present disclosure. Subscribers 18(1)-18(N) may include enterprises/departments/remote offices, mobile individual users with appropriate networking software clients installed on their mobile devices, such as laptops, remote teleworkers/home office, etc.

Subscribers 18(1)-18(N) can connect to cloud 12 over respective VPN tunnels 20(1)-20(N). As used herein, a "VPN tunnel" is a communications channel between two nodes that transports data by encapsulating the data's Internet Protocol (IP) packets according to any suitable cryptographic tunneling protocol. A node can be any electronic device, client, server, peer, service, application, or other object capable of sending, receiving, or forwarding information over communications channels in a network. Cryptographic tunneling protocols may include without limitation, Internet Protocol security (IPsec), Secure Socket Layer/Transport Layer Security (SSL/TLS), Datagram Transport Layer Security (DTLS), Microsoft Point-to-Point Encryption (MPPE), and Secure Shell (SSH).

In various embodiments, cloud capability sets 26(1)-26(N) may be associated with corresponding VPN tunnels 20(1)-20(N) in accordance with the SLA negotiated between respective subscribers 18(1)-28(N) and cloud service provider 29. As used herein, "cloud capabilities" include (a) capability to support different multicast encryption schemes; (b) capability to encrypt Layer 2 tunneling protocol (L2TP) version 2, or L2TPv3 tunnels; (c) capability to encrypt Generic Routing Encapsulation (GRE) tunnels; (d) capability to encrypt IPv6 traffic; (e) capability to provide different quality of service (QoS) for IPsec; (f) capability to support different VPN technologies including EzVPN, dynamic multipoint VPN (DMVPN), and group encrypted transport VPN (GETVPN); (g) capability to support IKEv2; (h) capability to support mobility including mobile VPN client and home agent/foreign agent (HA/FA); (i) capability to support Lempel-Ziv-Stac (LZS) compression before encryption; (j) capability to support data encryption standards (DES)/Triple DES (3DES)/Advanced Encryption Standard (AES) 256; (h) capability to support hot standby routing protocol (HSRP); (k) capability to support IPsec with network/port address translation (NAT/PAT), etc. In particular embodiments, cloud capabilities may also include functions that may be performed within a network to provide value to a manager or user of the network, including functions such as encryption, decryption, specialized routing, intrusion management, accounting, and other layer 3 through layer 7 applications that may reside on top of layer 2 switching and/or layer 3 routing services. In various embodiments, cloud capabilities may be differentiated into various tiers (e.g., Level 1, Level 2, etc.; Gold tier, Silver tier, etc.).

Likewise, services 14 may be offered to subscribers 18(1)-18(N) with multiple feature tiers and pricing levels depending on certain service characteristics, such as compute, network, and storage, for example, to tailor workload or application requirements to specific customer needs. Services 14 may be offered to each subscriber 18 according to service catalogs 28(1)-28(N). As used herein, the term "service catalog" encompasses a list of services offered by cloud service provider 29. Service catalogs 28(1)-28(N) may include a listing of services 14 corresponding to respective subscribers 18(1)-18(N). Infrastructure within cloud 12 may be configured for multi-tiered service and quality of service (QoS) settings so that subscribers 18(1)-18(N) can add or expand cloud capabilities and services 14.

According to example embodiments of communication system 10, IKE processing node 22 may offload VPN tunnels 20(1)-20(N) to one or more cryptographic modules 24(1)-24(M) based on cloud capability sets 26(1)-26(N) of respective VPN tunnels 20(1)-20(N). As used herein, the term "offload" includes transferring data from one network element (e.g., IKE processing node 22) to another network element (e.g., cryptographic modules 24(1)-24(M)). More specifically, the offloading can include transferring (or distributing) processing responsibilities between devices, or across multiple processors of a single device. This could allow, for example, one network device to receive and to accommodate additional flows, as the processing cycles (that the network device would otherwise be responsible for) are being performed by another network device. The offloading can further include transferring certain VPN tunnels to a different network device, which may be more capable of processing certain types of flows. For example, a certain legacy network device may benefit from offloading particular flows to a more capable network device, which is configured to handle such flows. Any such example activities are included within the broad scope of such offloading.

Cryptographic modules 24(1)-24(M) include hardware and associated software/firmware to support cloud capabilities, including providing cryptographic functions such as IPsec processing, encryption, decryption, key generation, and hashing, among others. In various embodiments, each cryptographic module 24 may support separate cloud capabilities. For example, cryptographic module 24(1) may provide DES and AES encryption; cryptographic module 24(2) may provide LZS compression; and so on. Each VPN tunnel 20 may be supported by one or more cryptographic modules 24(1)-24(M).

For purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Cloud computing is a style of computing in which dynamically scalable and often virtualized resources are provided as a service over the Internet. Users need not have knowledge of, expertise in, or control over the technology infrastructure "in the cloud" that supports them. The concept incorporates infrastructure as a service, platform as a service, software as a service, and other recent technology trends that have the common theme of reliance on the Internet for satisfying the computing needs of the users. A typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCoE) ports, switching and storage infrastructure, etc. The cloud can also consist of network services infrastructure like IPsec VPN hubs, firewalls, load balancers, wide area network (WAN) optimizers etc. Remote subscribers can access the cloud applications and services securely by connecting via a VPN tunnel, such as an IPsec VPN tunnel.

IPsec based VPN protocol is made up by two parts: (i) IKE protocol; and (ii) IPsec protocols. The first part, IKE, is the initial negotiation phase, where two VPN peers (e.g., routers) agree on which methods may be used to provide security for the underlying IP traffic and define the security associations (SAs) for the connection. When the IKE negotiation begins, the peer (e.g., router at the subscriber) that initiates the negotiation sends all its IKE policies (i.e., combination of security parameters to be used during the negotiation) to the remote peer (e.g., gateway at the cloud). An IKE processing node at the remote peer looks for a policy match by comparing its own IKE policies against the IKE policies received from the initiating peer. A match is found when IKE policies on both sides contain the same encryption, hash, authentication, and Diffie-Hellman (DH) parameter values. If there is more than one IKE policy match, the IKE policy with the highest priority is used. If no acceptable match is found, IKE refuses negotiation and IPsec communication will not be established. If a match is found, IKE will complete negotiation, and IPsec SAs will be created.

IPsec SAs are negotiated using the Internet Security Association and Key Management Protocol (ISAKMP) as defined by Request for Comments (RFC) 2408, promulgated by the Internet Engineering Task Force (IETF). ISAKMP format provides a consistent framework for transferring key and authentication data independent of any key generation technique, encryption algorithm and authentication mechanism. An ISAKMP message has a fixed header format, followed by a variable number of payloads. The fixed header contains fields carrying information required by the protocol to maintain state, process payloads and possibly prevent denial of service or replay attacks. In particular, a "next payload" field in the header defines values for predetermined payloads, with a value from 128-255 set aside for private use (e.g., any arbitrary use, not otherwise specified in the standards definition). The security parameters for establishing the VPN tunnels between the VPN peers are negotiated using such ISAKMP messages.

In general, the security parameters required for communication depends on the individual network configurations and environments of the respective peers connecting on the VPN tunnel. Different types of VPN devices implement different standards and features to support VPN tunnel set up, and the different devices may support different security parameters/IKE policies. Examples of VPN devices include Cisco® ASR1000, XR12000, 7600/6500, 7200, ISR, ASA, PIX, etc. For example, ASR1000 supports DMVPN, GETVPN, IPv6, DES, 3DES, and AES; XR12000 supports AES, DES, 3DES, and GRE, but not DMVPN. Even on a single VPN device, there could be different generations of IPsec VPN hardware modules with different feature sets and capabilities. For example, Cisco 6500 switches include VPN services module (VPNSM), IPsec shared port adapter (SPA), and VPN services port adapter (VSPA). VPNSM supports 3DES, DMVPN and GRE; IPsec-SPA supports AES, DES, 3DES, GRE, and DMVPN; and VSPA supports AES 128, 192, 256-bit key sizes, DES, and 3DES, but not DMVPN, and so on.

Because different devices support correspondingly different IKE policies and other security parameters, when subscribers connect to the cloud using disparate IKE policies, each subscriber may have to be supported by a different device in the cloud. For example, subscribers in the United States may connect via IPsec VPN while subscribers in Europe may typically use L2TP+IPsec. Financial customers may require encrypting multicast traffic to access financial application on the cloud's hosting servers. Some subscribers may additionally require QoS services on top of IPsec VPN, for example, if the subscribers host voice over IP (VoIP) or video services in the cloud. To support such varied IKE policies (and other services), the cloud service provider would have to deploy different types of IPsec VPN devices and modules in the cloud, resulting in increased operational costs and complexity.

Moreover, certain clouds such as data center clouds are typically planned for large scale traffic capabilities and terminating thousands of endpoints (e.g., branch routers for enterprise or software clients for consumers), and as such require many VPN devices. The VPN devices may not always be of the same type. Different VPN devices could be used for different feature sets, and as platforms evolve, there could be a mix of newer and older VPN devices deployed in the cloud. Currently, there is no mechanism to dynamically map customer requirement to a specific VPN service in the cloud easily. It is possible to deploy different IKE processing nodes for each service (e.g., mapping to a specific platform), but no mechanism exists currently to use a single IKE processing node and map to different VPN devices/services. Moreover, currently there are no mechanisms that can host network services like IPsec VPN services in a private cloud, and transparently offload the IPsec VPN services to a public cloud during peak times.

A system for secure cloud service delivery with prioritized services in a network environment, illustrated in FIG. 1, can resolve many of these issues. Embodiments of communication system 10 can facilitate ease of deployment and use, by providing a single IKE endpoint (e.g., IKE processing node 22) for subscribers 18(1)-18(N) to connect to, and then dynamically mapping subscribers 18(1)-18(N) to appropriate cryptographic modules 24(1)-24(M), which can support cloud capabilities of cloud capability sets 26(1)-26(N). In various embodiments, subscribers 18(1)-18(N) may request cloud capabilities using a "Cloud Request" in the IKE negotiation. For example, each subscriber 18 can ask for a different cloud capability set 26 through a suitable cloud request. In one embodiment, the cloud request from each subscriber 18 may include an ISAKMP packet listing the requested cloud capabilities in a private payload, for example, the ISAKMP payload reserved for private use (e.g., with "next payload" values 128-255). Such "cloud services payload" can convey the cloud request and may be sent in an authenticated IKE message.

In various embodiments, IKE processing node 22 may receive a request for cloud capability set 26(1) during the IKE negotiation associated with VPN tunnel 20(1) between subscriber 18(1) and cloud 12, where cloud capability set 26(1) may include one or more cloud capabilities. IKE processing node 22 may map the request to one or more cryptographic modules 24(1)-24(M) that can support cloud capability set 26(1) and offload VPN tunnel 20(1) to appropriate cryptographic modules 24(1)-24(M). Assume, merely for the sake of illustration, that cryptographic modules 24(1) and 24(2) can support the cloud capabilities in cloud capability set 26(1). Therefore, IKE processing node 22 may offload VPN tunnel 20(1) to cryptographic modules 24(1) and 24(2) (e.g., split VPN tunnel 20(1) between cryptographic modules 24(1) and 24(2)). IKE processing node 22 may thereafter provide the cloud capabilities in cloud capability set 26(1) to subscriber 18(1) through cryptographic modules 24(1) and 24(2).

IKE processing node 22 may further receive another request for cloud capability set 26(2) during the IKE negotiation associated with VPN tunnel 20(2) between subscriber 18(2) and cloud 12, where cloud capability set 26(2) may be different from cloud capability set 26(1). IKE processing node 22 may map cloud capability set 26(2) to one or more cryptographic modules 24(1)-24(M) that can support cloud capability set 26(2) and offload VPN tunnel 20(2) to cryptographic modules 24(1)-24(M). Assume, merely for the sake of illustration, that cryptographic module 24(3) can support substantially all the cloud capabilities in cloud capability set 26(2). Therefore, IKE processing node 22 may offload VPN tunnel 20(2) to cryptographic module 24(3). IKE processing node 22 may thereafter provide the cloud capabilities in cloud capability set 26(2) to subscriber 18(2) through cryptographic module 24(3).

According to some embodiments, cloud capabilities may be differentiated into any suitable number of tiers, according to any suitable criteria. For example, tiers may be differentiated into four levels, Gold, Silver, Bronze, and Palladium, based on demand (e.g., cloud capabilities 26(1) with higher demand may be on a Gold tier; cloud capabilities 26(2) with lower demand may be on a Bronze tier, etc.). In another example, tiers may be differentiated based on cloud infrastructure costs (e.g., cloud capabilities 26(1) requiring higher cost routers may be on a Gold tier; cloud capabilities 26(2) requiring lower cost routers may be on a Bronze tier, etc.). In yet another example, tiers may be differentiated arbitrarily. In some embodiments, some cloud capabilities may overlap between one or more tiers (e.g., Gold, Silver, and Bronze tiers may support EZVPN), while other cloud capabilities 26 may not overlap between two tiers (e.g., only Gold tier offers support for LZS compression, while Silver and Bronze do not). Any suitable scheme may be used to separate the cloud capabilities into various tiers within the broad scope of the present disclosure.

In some embodiments, each cloud capability set 26 may correspond to a tier (e.g., cloud capability set 26(1) may correspond to substantially all cloud capabilities of a Gold tier; cloud capability set 26(2) may correspond to substantially all cloud capabilities of a Bronze tier; etc.). In other embodiments, each cloud capability set 26 may include cloud capabilities that form a subset of substantially all cloud capabilities of a tier (e.g., cloud capability set 26(1) may include two cloud capabilities of a Gold tier; cloud capability set 26(2) may include five cloud capabilities of a Gold tier; etc.) In yet other embodiments, each cloud capability set 26 may include cloud capabilities from one or more tiers (e.g., cloud capability set 26(1) may include two cloud capabilities of a Gold tier and one cloud capability of a Silver tier; etc.) In some cases, cloud capabilities may be purchased by subscribers 18(1)-18(N) under a variable pricing model.

Likewise, any number of differentiated tiers for services 14 may be offered in cloud 12. For example, services 14 can be differentiated into pre-defined service tiers by varying support of features such as virtual machine resources, storage features, application tiers, stateful services, QoS agreements, etc. In one example, a "Gold" tier could consist of secure VPN access, firewall, load balancing, intrusion prevention, better QoS, virtual machines (VMs) of four virtual central processing units (vCPUs) and 16 G memory, and 200 G storage disks with cloning for data protection. A "Bronze" tier could consist of VPN access, firewall, VMs of 1 vCPU and 2 G memory, and 50 GB disk with snapshots for data protection.

Service tiers can vary based on storage features, such as redundant array of independent disks (RAID) levels, disk types and speeds, and backup and snapshot capabilities. For example, a Gold tier could offer three tiers of RAID-10 storage using 15K rpm Fibre Channel (FC), 10K rpm FC, and Serial Advanced Technology Attachment (SATA) drives. A Bronze tier might offer a single RAID-5 storage tier using SATA drives. Service tiers can also vary based on differentiated support for application hosting. In some instances, applications may require several application tiers of VMs. Each tier may be placed on separate virtual local area networks (VLANs). For example, a Gold tier could have three application tiers on three separate VLANs to host web, application, and database (DB) services on different VMs, with each tier providing five VMs for redundancy and load balancing. A Silver tier could also have three tiers for web, application, and DB services, and each tier may have two VMs for redundancy and load balancing. A Bronze tier could have three tiers but in a less differentiated manner, with the web, application, and DB services residing on the same VLAN or potentially on the same VM.

Customer workloads can also be differentiated by services 14 applied to each tier, for example, firewalls, encryption, load balancers, protocol optimization, application firewalls, wide area network (WAN) optimization, advanced routing, redundancy, disaster recovery, etc. Within a service like firewall, further differentiation among tiers may be possible, for example, inter-VLAN, intra-VLAN, or intra-host inspections. For example, a Gold tier might include firewall inspection, SSL offloading, IPsec encryption, server load balancing, and WAN optimization. A Silver tier might offer firewall inspection and server load balancing.

Bandwidth control during periods of network congestion can be another differentiator of services 14. QoS policies can prioritize bandwidth by service tier. Traffic classification, prioritization, and queuing and scheduling mechanisms can identify and offer minimum bandwidth guarantees to tenant traffic flows during periods of congestion. For example, a Gold service tier might be given the highest priority and a minimum network bandwidth guarantee of 50%. A Bronze service tier might receive best-effort treatment only and no minimum bandwidth guarantees. Any suitable scheme may be used to separate services 14 into various tiers within the broad scope of the present disclosure. The tiers of cloud capabilities and services 14 described herein are merely representative and are not intended as limitations. Virtually any number of tiers and types of differentiation of cloud capabilities and/or services 14 may be implemented within the broad scope of the present disclosure.

In operation, IKE processing node 22 may receive a cloud request as part of the IKE negotiation with subscriber 18. In one embodiment, the cloud requests may be received from respective subscribers 18(1)-18(N). The cloud capability information can be configured within an ISAKMP profile (e.g., enabling modularity of ISAKMP configurations for IKE negotiations), EzVPN profile, or Crypto Map (e.g., Cisco® IOS software configuration entity that selects data flows needing security processing and defining the policy for these flows and the crypto peer that traffic needs to go to), or other suitable configuration element (e.g., depending on the type of IPsec VPN tunnel being used). Assume, merely for illustrative purposes, that subscriber 18(1) negotiates VPN tunnel 20(1) with cloud capability set 26(1) including 3DES encryption, DMVPN and LZS compression, and subscriber 18(2) negotiates VPN tunnel 20(2) with cloud capability set 26(2) including DES and mobility with HA/FA support. Assume also for illustrative purposes only, that cryptographic module 24(1) can support 3DES encryption and DMVPN, cryptographic module 24(2) can support LZS compression, and cryptographic module 24(3) can support DES and mobility with HA/FA.

Subscribers 18(1) and 18(2) may send respective cloud requests in appropriate ISAKMP payloads including the requested cloud capabilities. IKE processing node 22 may analyze the ISAKMP payloads, determine the cloud capabilities, map the cloud capabilities to appropriate cryptographic modules (e.g., one or more of cryptographic modules 24(1)-24(M) that support such capabilities and offload VPN tunnels 20(1) and 20(2) appropriately. For example, VPN tunnel 20A(1) may be split and offloaded to cryptographic module 24(1) for providing 3DES encryption and DMVPN, and to cryptographic module 24(2) for LZS compression. VPN tunnel 20(2) may be offloaded to cryptographic module 24(3) for DES and mobility with HA/FA.

Alternately, it may be also possible for IKE processing node 22 to assign cloud capabilities locally (or from authentication/authorization/accounting (AAA) services for subscribers 18), for example, based on the IKE-ID (e.g., identifier of a particular IKE negotiation). For example, the cloud request may be received from service catalogs 28(1)-28(N), which contain authorized cloud capabilities derived from respective SLAs between corresponding subscribers 18(1)-18(N) and cloud service provider 29 managing cloud 12. Thus, service catalogs 28(1)-28(N) may be tailored for respective subscribers 18(1)-18(N). For example, subscriber 18(1) may have a corresponding service catalog 28(1), which may be different from service catalog 28(2) for subscriber 18(2).

Each service catalog 28 may include a description of the respective subscriber's account level information (such as specific customer pricing under the respective SLA); description of products and services that can be ordered from cloud service provider 29; a description of products and services used by the subscriber; pricing of various products and services; invoices and payment status; technical and billing administrators; etc. Each service catalog 28 may include an application programming interface (API) with suitable actions, such as "create catalog," "create cloud request," "add service," etc. Each service catalog 28 may comprise suitable data models (e.g., in a self-describing format such as XML) holding the requisite information; structures (e.g., to describe the products and services); and API to interact therewith. Orchestration engine 16 may use information in service catalogs 28(1)-28(N) to process, order, provision, and operate services 14 for respective subscribers 18(1)-18(N).

Assume, merely for illustrative purposes, that subscriber 18(1)'s SLA with cloud service provider 29 specifies that subscriber 18(1) may have signed up for a Gold tier service, including certain cloud capabilities such as 3DES encryption, DMVPN and LZS compression. The cloud capabilities for subscriber 18(1) may be included in service catalog 28(1). Likewise, subscriber 18(2) may have signed up for a Bronze tier service, including certain cloud capabilities such as DES and mobility with HA/FA. The cloud capabilities for subscriber 18(2) may be included in service catalog 28(2). When subscribers 18(1) and 18(2) initiate respective VPN tunnels 20(1) and 20(2) with IKE processing node 22 (e.g., using standard ISAKMP payloads), respective service catalogs 28(1) and 28(2) may forward appropriate cloud requests, including the appropriate cloud capabilities, to IKE processing node 22. In some embodiments, the cloud request may be in suitable ISAKMP cloud payloads as described earlier.

IKE processing node 22 may analyze the cloud requests, determine the cloud capabilities, map the cloud capabilities to appropriate cryptographic modules 24(1)-24(M) that support such cloud capabilities and offload tunnels 20(1) and 20(2) appropriately. For example, VPN tunnel 20(1) may be split and offloaded to: (i) cryptographic module 24(1) for providing 3DES encryption and DMVPN; and (ii) cryptographic module 24(2) for providing LZS compression. VPN tunnel 20(2) may be offloaded to cryptographic module 24(3) for providing DES and mobility with HA/FA.

In yet another embodiment, IKE processing node 22 may receive the cloud requests from subscribers 18(1)-18(N) and verify the cloud capabilities with the respective subscribers' SLAs as described in respective service catalogs 28(1)-28(N). Assume, merely for illustrative purposes, that subscriber 18(1)'s SLA with cloud service provider 29 specifies that subscriber 18(1) has signed up for a Gold tier service, including certain cloud capabilities such as 3DES encryption, DMVPN and LZS compression. Likewise, subscriber 18(2) has signed up for a Bronze tier service, including certain cloud capabilities such as DES and mobility with HA/FA, but no LZS compression.

Assume that subscriber 18(1) sends a cloud request for cloud capability set 26(1) including 3DES encryption, DMVPN and LZS compression. IKE processing node 22 may receive the cloud request, poll service catalog 28(1), and determine that the cloud request matches the Gold tier service for which subscriber 18(1) has signed up. IKE processing node 22 may thereupon map the cloud capabilities to the respective cryptographic modules (e.g., 24(1) and 24(2)) that support the requested cloud capabilities and offload VPN tunnel 20(1) appropriately.

Assume, in the above example embodiment, that subscriber 18(2) sends a cloud request for cloud capability set 26(2) comprising DES, mobility with HA/FA and LZS compression. IKE processing node 22 may receive the cloud request, compare with service catalog 28(2), and determine that the request does not match the Bronze tier service for which subscriber 18(2) has signed up. In one embodiment, if at least one cloud capability in cloud capability set 26(2) does not match any of the authorized cloud capabilities in service catalog 28(2), the IKE negotiation may fail, and the request may be consequently denied. In another embodiment, IKE processing node 22 may allow only those cloud capabilities in cloud capability set 26(2) that match with the authorized cloud capabilities in service catalog 28(2), while denying requests for any other cloud capabilities. In the example, such cloud capabilities would include DES and mobility with HA/FA. IKE processing node 22 may then off load VPN tunnel 20(2) to cryptographic module 24(3) that can support DES and mobility with HA/FA.

Turning to the infrastructure of FIG. 1, elements of communication system 10 may represent a series of points or nodes of interconnected communication paths for receiving and transmitting packets of information, which propagate through communication system 10. Elements of communication system 10 may include network elements (not shown) that offer a communicative interface between servers (and/or users) and may be any local area network (LAN), a wireless LAN (WLAN), a metropolitan area network (MAN), a virtual LAN (VLAN), VPN, a wide area network (WAN), or any other appropriate architecture or system that facilitates communications in a network environment.

Elements of FIG. 1 may be coupled to one another through one or more interfaces employing any suitable connection (wired or wireless), which provides a viable pathway for electronic communications. Additionally, any one or more of these elements of FIG. 1 may be combined or removed from the architecture based on particular configuration needs.

Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs.

Network connection 19 may include any suitable equipment, infrastructure, or communication link to IKE processing node 22, such as wireless technologies (e.g., IEEE 802.11, 802.16, WiFi, WiMax, etc.), satellite, cellular technologies (e.g., 3G, 4G, etc.), etc., or any combination thereof. Embodiments of elements in communication system 10 may include one or more distinct network interfaces to facilitate communication via the various networks (including both internal and external networks) described herein. Such network interfaces may be inclusive of multiple wireless interfaces (e.g., WiFi, WiMax, 3G, 4G, white space, 802.11x, satellite, Bluetooth, near field communication (NFC), LTE, GSM/WCDMA/HSPA, CDMA1x/EVDO, DSRC, CAN, GPS, etc.). Other interfaces represented by network interfaces may include physical ports (e.g., Ethernet, USB, HDMI, etc.), interfaces for wired and wireless internal subsystems, and the like.

Subscribers 18(1)-18(N) include any suitable infrastructure, such as VPN gateways, user terminals, laptops, computers, and other network elements to facilitate the activities described herein. As used herein, the term "network element" is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Services 14 may be delivered to subscribers 18(1)-18(N) according to various service models, including software-as-a-service (e.g., allowing subscribers 18(1)-18(N) to use applications running on cloud 12), platform-as-a-service (e.g., allowing subscribers 18(1)-18(N) to deploy onto cloud 12, applications created using programming languages and tools supported by cloud 12), infrastructure-as-a-service (e.g., allowing subscribers 18(1)-18(N) to provision processing, storage, networks and other computing resources to enable deployment and running of arbitrary software including operating systems and applications), etc.

According to embodiments of communication system 10, IKE processing node 22 and each cryptographic module 24 may be suitably configured network elements or parts thereof that can facilitate the activities discussed herein. In some embodiments, IKE processing node 22 and cryptographic modules 24(1)-24(M) may be implemented on the same network element. For example, an advanced network switch (e.g., Cisco® 6500) switch may include hardware and software to perform IKE processing as well as cryptographic modules such as VPNSM, IPsec-SPA, VSPA, etc. In other embodiments, IKE processing node 22 and cryptographic modules 24(1)-24(M) may be implemented on separate network elements. For example, IKE negotiation may be performed on a dedicated device and cryptographic functions may be offloaded to separate devices, including old generation VPN devices that have limited functionality and latest generation advanced routers with several cryptographic functionalities. Each cryptographic module 24 may be further configured to handle data plane IPsec traffic, whereas IKE processing node 22 may be further configured to handle control plane traffic.

In addition, embodiments of communication system 10 may provide cloud capabilities and services 14 to different subscribers (e.g., 18(1)-18(N)) for securely accessing cloud 12. For example, embodiments of communication system 10 may provide different cloud capabilities in cloud capability sets 26(1)-26(N) to different subscribers 18(1)-18(N) utilizing a single IKE endpoint (e.g., IKE processing node 22), thereby making deployments simple. New control messaging can be leveraged to take care of control plane messaging between IKE processing node 22 and cryptographic modules 24(1)-24(M), for example, for syncing up security associations information and other related messaging for rekeys, etc. Requests for cloud capabilities and services 14 can be dynamically signaled from subscribers 18(1)-18(N) to cloud 12 via suitable payloads (e.g., ISAKMP cloud payloads). Existing hardware in cloud 12 may be maintained for supporting basic IPsec VPN services for no-frills subscribers, whereas newer platforms can be provisioned for supporting newly available services for subscribers requiring such new services.

Separately, embodiments of communication system 10 can support mix and match of cryptographic modules 24(1)-24(M) and pay-as-you-grow deployments in cloud 12 and, further, provide for dynamically offloading cloud capabilities (e.g., IPsec VPN services) from private cloud to public clouds, thereby enabling true on-demand elastic cloud services. Embodiments of communication system 10 may enable offloading crypto processing to cloud 12, for example, by re-directing subscriber 18 to directly send encrypted traffic to cloud 12, or by simply forwarding encrypted traffic to cloud 12 for crypto processing.

Figure 2:
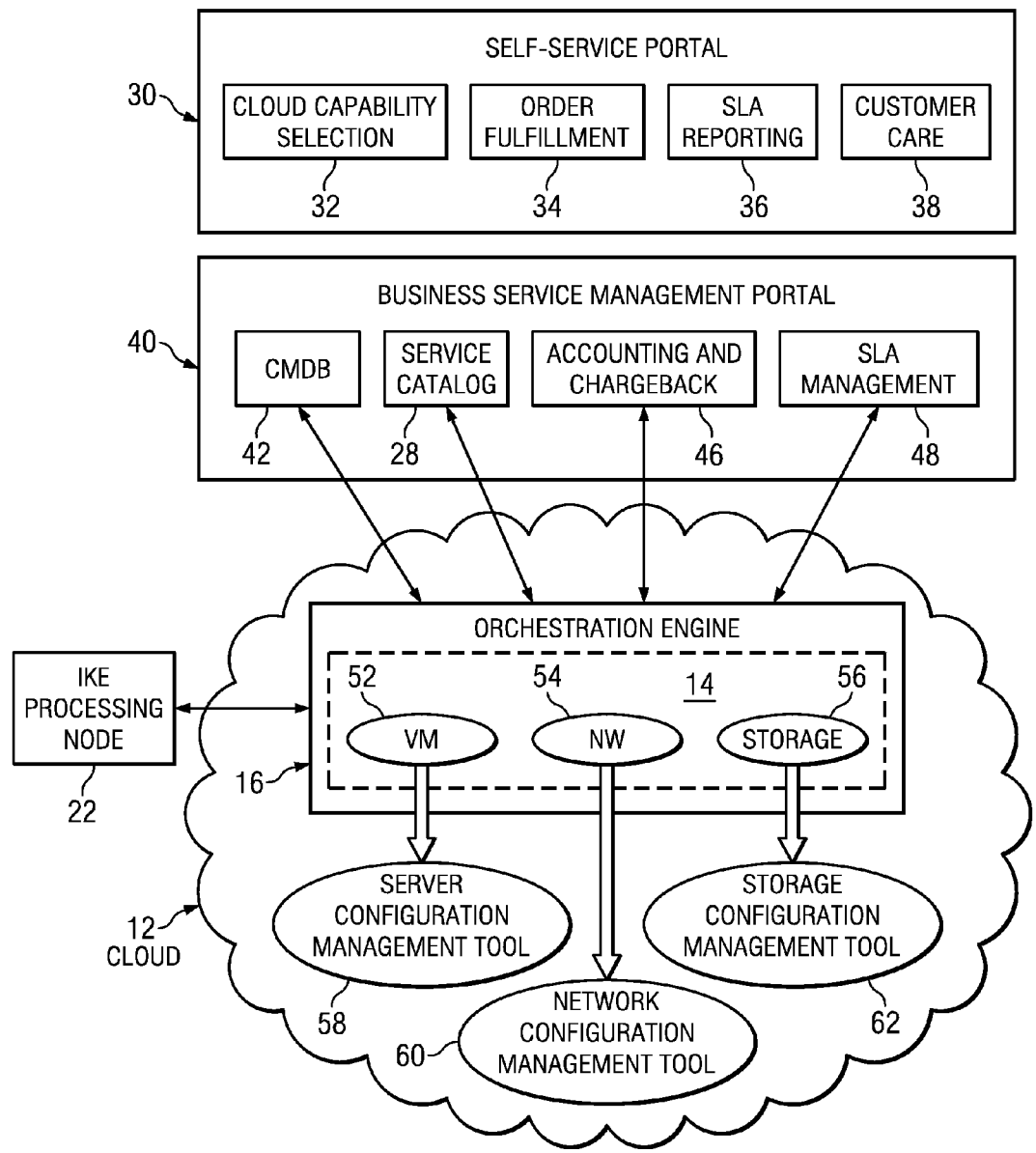
FIG. 2 is a simplified block diagram illustrating additional details of the communication system.

Turning to FIG. 2, FIG. 2 is a simplified block diagram illustrating additional details of communication system 10. A self-service portal 30 may be enabled with a service orchestration framework solution, including options for cloud capability selection 32, order fulfillment 34, SLA reporting 36, and customer care 38. A business service management portal 40 includes a configuration management database (CMDB) 42, service catalog 28, an accounting and chargeback application 46, and an SLA management module 48.

Orchestration engine 16 in cloud 12 may orchestrate subscriber service requests back and forth from resources (e.g., VMs 52, networks (NW) 54, and storage 56) with appropriate management tools, including server configuration management tool 58, network configuration management tool 60 and storage configuration management tool 62. VMs 52, NW 54, and storage 56 may enable provision of services 14 from cloud 12. Orchestration engine 16 can facilitate provisioning of separate subscriber resources and efficient mapping of interdependent cloud services in addition to other features. Orchestration engine 16 can facilitate aligning a request for services 14 with applications, data, and infrastructure in cloud 12. Orchestration engine 16 may define policies and service levels through automated workflows, provisioning, change management, and other suitable management features, for example, to create an application-aligned infrastructure that can be scaled up or down based on the needs of each application or subscriber 18. Orchestration engine 16 can also provide centralized management of resources (e.g., VMs 52, networks (NW) 54, and storage 56), including billing, metering, and chargeback for consumption. In various embodiments, orchestration engine 16 can manage complex cross-domain (e.g., system, firewall, enterprise, etc.) processes and handle exceptions.

Each subscriber 18 may view self-service portal 30 on respective devices (e.g., computer, laptop, mobile phone, etc.) In some embodiments, self-service portal 30 may be tailored for each subscriber 18; thus, self-service portal 30 visible to subscriber 18(1) may different from self-service portal 30 visible to subscriber 18(2). Self-service portal 30 may be implemented via a graphical user interface (GUI), for example, to facilitate selection of various options, querying, etc. Through self-service portal 30, subscriber 18 may select cloud capabilities through cloud capability selection 32. For example, a VPN gateway (e.g., router) of subscriber 18's local network may provide a cloud capability set 26 according to a Gold tier. In such a case, cloud capability selection 32 may display a list of Gold tier cloud capabilities. In another example, subscriber 18 may choose certain cloud capabilities from a list of options (e.g., drop down menu list) that may be a sub-set of VPN services offered by the respective VNP gateway of the subscriber's local network. Various schemes may be used by subscriber 18 to select cloud capabilities within the broad scope of the present disclosure.

In an example embodiment, IKE processing node 22 may offload VPN tunnel 20 to cryptographic modules 24(1)-24(M) and convey the offload information to orchestration engine 16. Orchestration engine 16 may then suitably configure infrastructure and network resources so that services 14 are channeled through appropriate cryptographic modules 24(1)-24(M). In another example embodiment, IKE processing node 22 may receive a VPN tunnel request (e.g., request to set up a VPN tunnel) from subscriber 18 and convey the VPN tunnel request to orchestration engine 16. Orchestration engine 16 may respond with information from service catalog 28. IKE processing node 22 may provision cloud capabilities across various cryptographic modules 24(1)-24(M) accordingly. In yet another example embodiment, subscriber 18 may send a cloud request for cloud capabilities to IKE processing node 22. IKE processing node 22 may poll orchestration engine 16 for service catalog 28. IKE processing node 22 may compare the cloud capabilities in the cloud request to service catalog 28 and allow the cloud request if a match is found. Otherwise, the cloud request may be denied.

Figure 3:
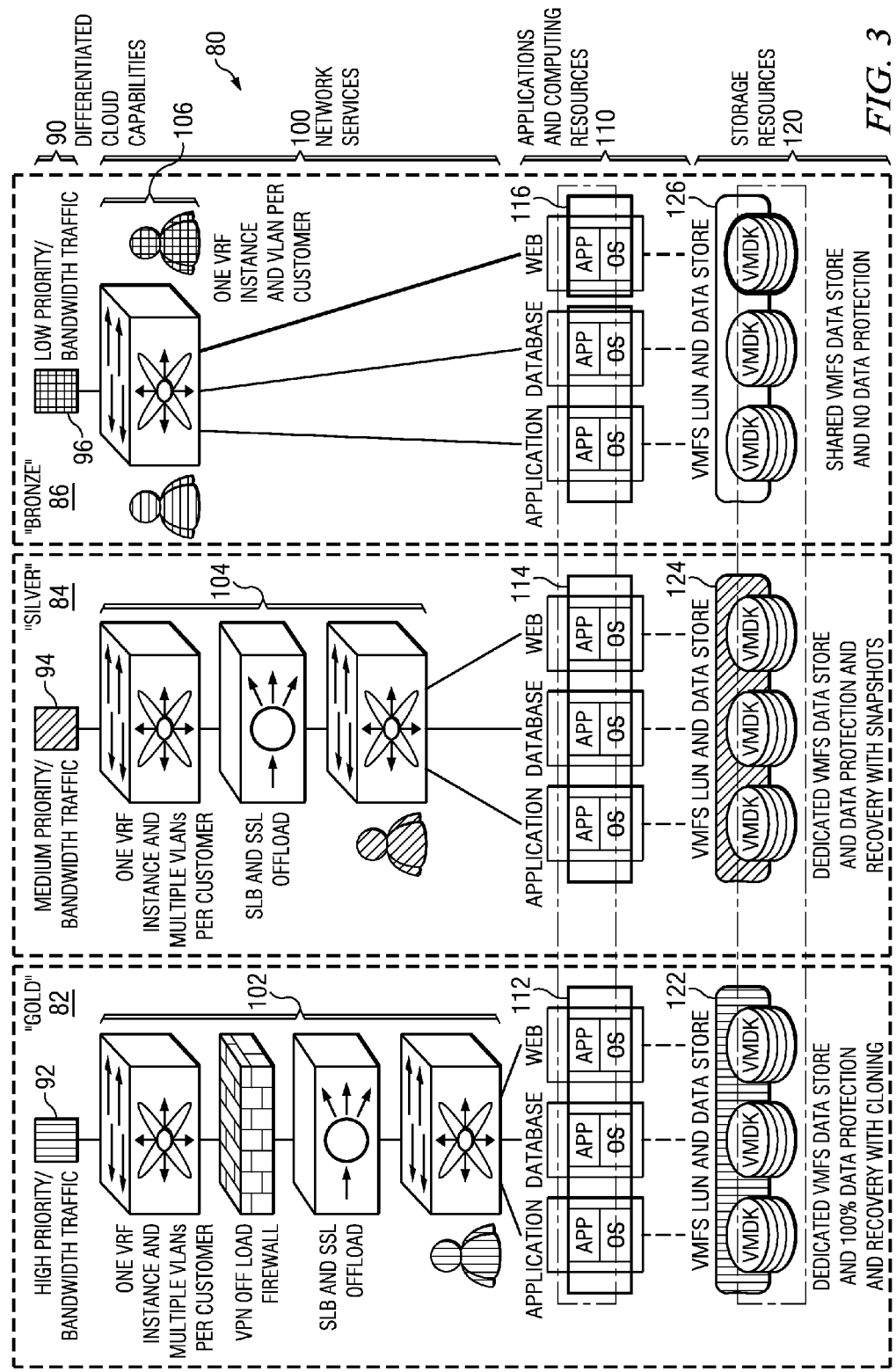
FIG. 3 is a simplified diagram illustrating details of example embodiments that may be associated with the communication system.

Turning to FIG. 3, FIG. 3 is a simplified block diagram showing additional details of communication system 10. Example tiers 80 may comprise a gold tier 82, a silver tier 84, and a bronze tier 86. The tiers shown and described herein are for example purposes only. Any number of tiers, with virtually any type of differentiated cloud capabilities 90, network services 100, applications and computing resources 110 and storage resources 120 may be implemented in communication system 10 within the broad scope of the present disclosure.

In one example, gold tier 82 may include differentiated cloud capabilities 92 having high priority/bandwidth traffic. Cloud capabilities 92 may include HSRP, GRE, and DES/3DES encryption and other features. Network services 102 may include one virtual routing and forwarding (VRF) instance and multiple VLANs per customer, VPN offload firewall, and server load balancing (SLB) and secure sockets layer (SSL) offload. Applications and computing resources 112 may include multiple VMs provisioned with respective applications and operating systems for each of application, database, and web resources. Storage resources 122 may include virtual machine file system (VMFS) data store and 100% data protection with recovery with cloning. VMFS logical unit number (LUN) and data store may include virtual machine disks (VMDK) as appropriate. Ratio of virtual machines to physical machines may be 1:1; 40% of the bandwidth may be reserved for gold tier 82. Disaster recovery may be an automatically preselected option, and backup retention may be for a long duration, such as 1 year.

Silver tier 84 may include cloud capabilities 94 having medium priority/bandwidth traffic. Differentiated cloud capabilities 94 may include GRE, and DES/AES encryption and other features. Network services 104 may include one VRF instance and multiple VLANs per customer (similar to Gold tier 82), and SLB and SSL offload (but no firewall as in gold tier 82). Applications and computing resources 114 may include multiple VMs provisioned with respective applications and operating systems for each of application, database, and web resources. Storage resources 124 may include VMFS data store and data protection with recovery with snap shots. VMFS LUN and data store may include a lower number of VMDKs as appropriate. Ratio of virtual machines to physical machines may be 2:1; 30% of the bandwidth may be reserved for silver tier 84. Disaster recovery may be an automatically preselected option, and backup retention may be for a shorter duration, such as 6 months.

Bronze tier 86 may include cloud capabilities 96 having low priority/bandwidth traffic. Differentiated cloud capabilities 96 may include DES/AES encryption and other features. Network services 106 may include one VRF instance and VLAN per customer, but no SLB/SSL offload or firewall. Applications and computing resources 116 may include one VM per customer (e.g., one VM each for web, database, and application). Storage resources 126 may include a shared VMFS data store and no data protection. Ratio of virtual machines to physical machines may be 3:1; 20% of the bandwidth may be reserved for bronze tier 86. There may be no disaster recovery or backup retention.

Figure 4:
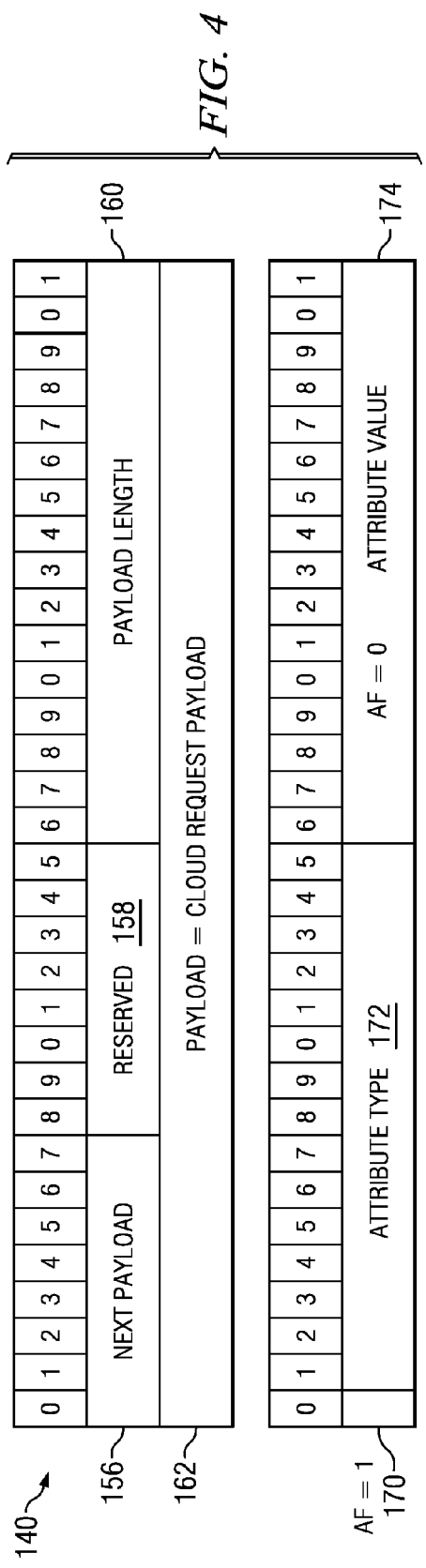
FIG. 4 is a simplified diagram illustrating an example packet that may be associated with embodiments of the communication system.

Turning to FIG. 4, FIG. 4 is a simplified block diagram showing an example packet format according to an embodiment of the present disclosure. An ISAKMP packet 140 may include a next payload field 156 consisting of 8 bits (i.e., 1 octet). Next payload field 156 can indicate the type of the first payload in the message. For example, a value of 0 may indicate no payload (i.e., the current payload is the last message); a value of 1 may indicate that the payload is a SA; a value of 6 may indicate that the payload is a certificate; etc. According to ISAKMP standards, values up to 13 have been predefined; values from 14-127 may be reserved; values 128-255 may be set aside for private use. According to embodiments of communication system 10, next payload field 156 may use values 128-255 to indicate the cloud request payload. The next 8 bits may be a reserved field 158. It may be unused, e.g., set to 0. Reserved field 158 may be followed by a payload length field 160 of 2 octets. A payload cloud field 162 may include a cloud request payload.

According to various embodiments, based on the generic ISAKMP payload header format, data attribute fields in the header may be used to convey the cloud request. There can be multiple data attributes within a payload. Data attributes may include cloud capabilities. The data attribute values can be a 3-bit value indicating a pre-determined capability. In one example, some possible data attribute values could be: 1=Multicast traffic; 2=Compression; 3=L2TP traffic; 4=IPv6 traffic; 5=GRE traffic; 6=AES; 7=Mobility; etc. An attribute format bit 170 indicates whether the data attributes follow the Type/Length/Value (TLV) format or a shortened Type/Value (TV) format. If attribute format bit 170 is a zero (0), then the data attributes are of TLV form. If attribute format bit 170 is a one (1), then the data attributes are of the TV form. According to embodiments of the present disclosure, attribute format bit 170 may be set to 1, indicating that the data attributes to follow are of the TV form.

An attribute type field 172 can be a unique identifier for each type of attribute. An attribute value field 174 may be of variable length, depending on the value of attribute format bit 170. If attribute format bit 170 is 1, as in some embodiments, attribute value field 174 may have a length of 2 octets. Attribute value field 174 may include the data attribute values (e.g., 1=multicast traffic; 2=compression; etc.). These cloud codes may be used to convey the cloud capabilities required by subscriber 18 and thus the underlying VPN service required from cloud 12.

Figure 5:
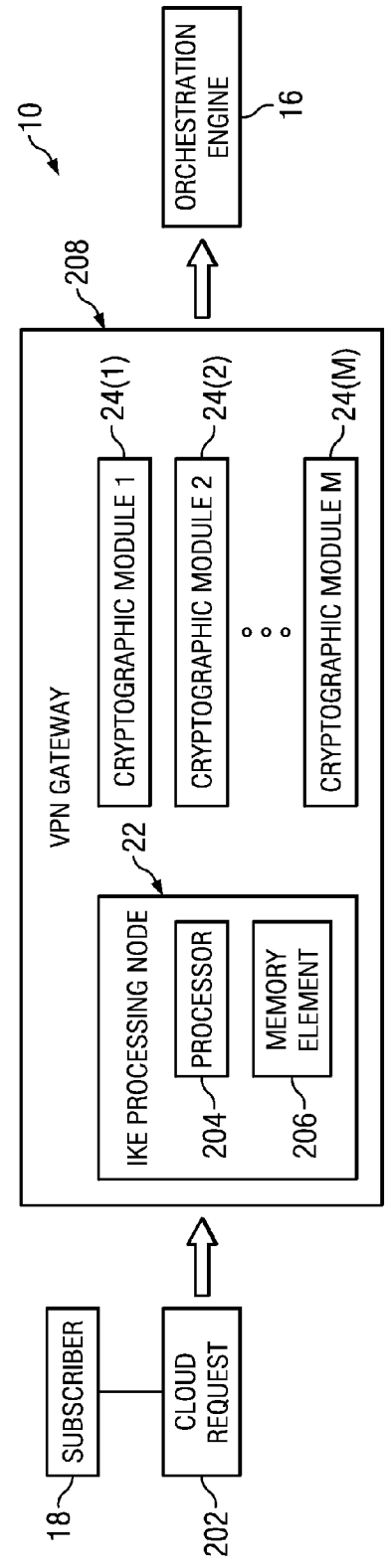
FIG. 5 is a simplified block diagram illustrating details of an embodiment of the communication system.

Turning to FIG. 5, FIG. 5 is a simplified block diagram showing details of communication system 10. Subscriber 18 may send a cloud request 202 to a VPN gateway 208. In some embodiments, cloud request 202 may be a back-end request, not part of any IKE negotiation. VPN gateway 208 may be a router or suitable network element configured with appropriate software to facilitate the activities described herein. In various embodiments, cloud request 202 may comprise ISAKMP packet 140, with cloud capabilities listed in attribute value field 174. VPN gateway 208 may include IKE processing node 22 comprising a processor 204 and a memory element 206. VPN gateway 208 may also include one or more cryptographic modules 24(1)-24(M).

IKE processing node 22 may receive cloud request 202 comprising a request for cloud capability set 26. Based on the data attributes of the cloud payload, IKE processing node 22 may assign VPN tunnel 20 and IPsec SA's to available cryptographic modules 24(1)-24(M) that can support the requested capabilities. Data plane IPsec traffic may then be handled by cryptographic modules 24(1)-24(M), to which VPN tunnel 20 has been offloaded. The information regarding offloading of VPN tunnel 20 may then be communicated to orchestration engine 16 to coordinate delivery of services 14 according to cloud request 202.

In an example embodiment, VPN gateway 208 may be a router (e.g., Cisco 6500 platform) with multiple cryptographic modules 24(1)-24(M) embedded therein. Processor 204 may include a route processor that can set up VPN tunnel 20. In some embodiments, DH cryptographic calculations can be offloaded to any of available cryptographic modules 24(1)-24(M), and VPN tunnel 20 may or may not be processed by the same cryptographic module. For example, if DH cryptographic calculations for the IKE negotiation are offloaded to cryptographic module 24(1), VPN tunnel 20 may be processed by any of cryptographic modules 24(2)-24(M).

In another example embodiment, cryptographic module 24(1) may be a VSPA with a carrier card (e.g., SSC600) that can support good QoS and multicast replication capabilities. If a VPN tunnel request from subscriber 18 comes in with cloud request 202 for QoS or multicast, IKE processing node 22 can associate the VPN tunnel with cryptographic module 24(1) (e.g., VSPA). If subscriber 18 requests compression, the VPN tunnel can be offloaded to a compression capable cryptographic module (e.g., 24(2)). In example embodiments, differences in capabilities between cryptographic modules 24(1)-24(M) can be taken advantage of by splitting VPN tunnels between cryptographic modules 24(1)-24(M) based on their respective capabilities.

Figure 6:
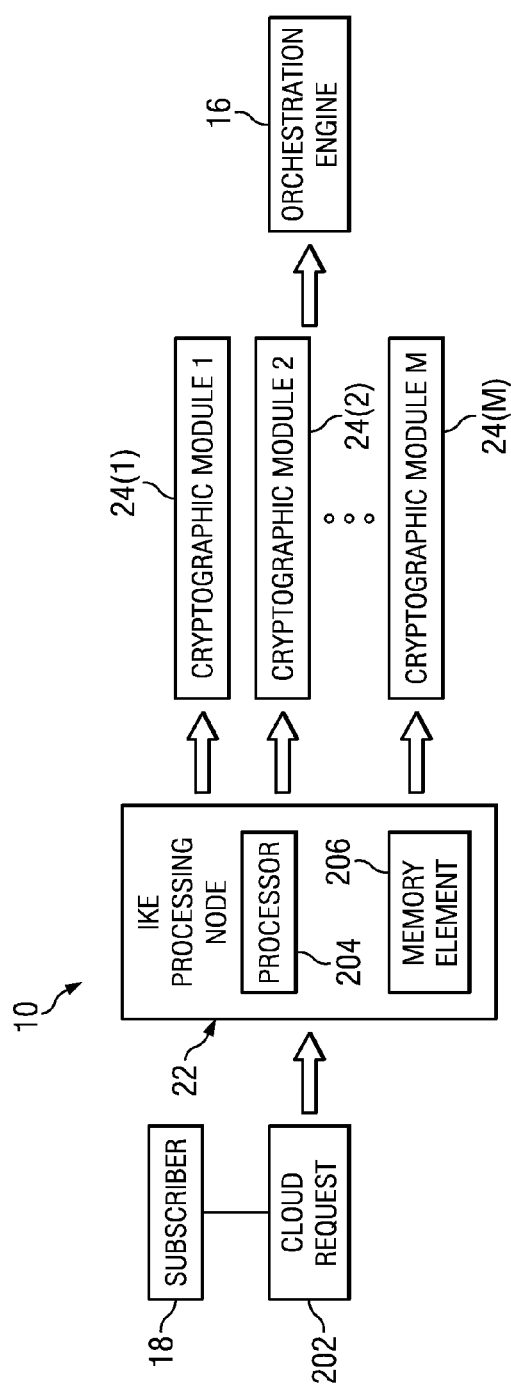
FIG. 6 is a simplified block diagram illustrating details of another embodiment of the communication system.

Turning to FIG. 6, FIG. 6 is a simplified block diagram showing details of communication system 10. Subscriber 18 may send cloud request 202 to IKE processing node 22, comprising processor 204, and memory element 206. In various embodiments, cloud request 202 may comprise ISAKMP cloud packet 140, with cloud capabilities listed in attribute value field 174. IKE processing node 22 may inspect cloud request 202, determine cloud capabilities from the IKASMP message and offload VPN tunnel 20 to an appropriate group of cryptographic modules 24(1)-24(M). In example embodiments, one or more cryptographic modules 24(1)-24(M) may be provisioned in a single network element, or alternatively, each cryptographic module 24 may be provisioned on separate network elements. For example, if subscriber 18 requests IPSec+L2TP cloud capability, IKE processing node 22, which may be provisioned on a router (e.g., Cisco 6500) that does not support broadband encryption, can assign VPN tunnel 20 to another suitable network element (e.g., ASR1000), which can support broadband encryption. The information regarding offloading of VPN tunnel 20 may then be communicated to orchestration engine 16 to coordinate delivery of services 14 according to cloud request 202.

In some embodiments, IKE processing node 22 may be provisioned with a Service Insertion Architecture (SIA) and its service broker can be leveraged to handle control plane messaging between IKE processing node 22 and cryptographic modules 24(1)-24(M), for example, to sync up SA information and other related messaging for rekeys etc. In various embodiments, cryptographic modules 24(1)-24(M) can contact the service broker to register cloud capabilities.

Figure 7:
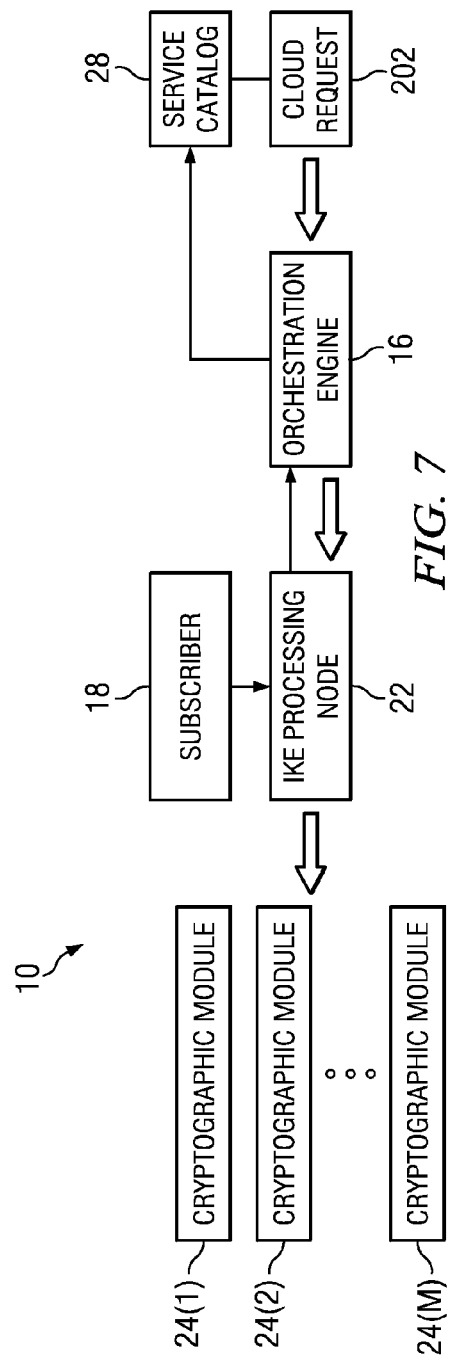
FIG. 7 is a simplified block diagram illustrating details of yet another embodiment of the communication system.

Turning to FIG. 7, FIG. 7 is a simplified block diagram illustrating another example embodiment of communication system 10. Service catalog 28 may be used to create cloud request 202. In one embodiment, service catalog 28 may include a suitable API to enable automatic creation of cloud request 202 when subscriber 18 sends a VPN tunnel request to IKE processing node 22. For example, when subscriber 18 sends the VPN tunnel request, IKE processing node 22 may forward the information to orchestration engine 16, which may interact with service catalog 28 to generate cloud request 202. Cloud request 202 may then be forwarded by orchestration engine 16 to IKE processing node 22 appropriately. In one embodiment, cloud request 202 may comprise ISAKMP packet 140, with cloud capabilities listed in attribute value field 174. In another embodiment, cloud request 202 may be a back end communication, and not part of any IKE negotiation. For example, cloud request 202 may be created with a suitable application programming interface (API) or other appropriate mechanisms. IKE processing node 22 may inspect cloud request 202, determine cloud capabilities from the IKASMP message and offload VPN tunnel 20 to appropriate cryptographic modules 24(1)-24(M).

Figure 8:
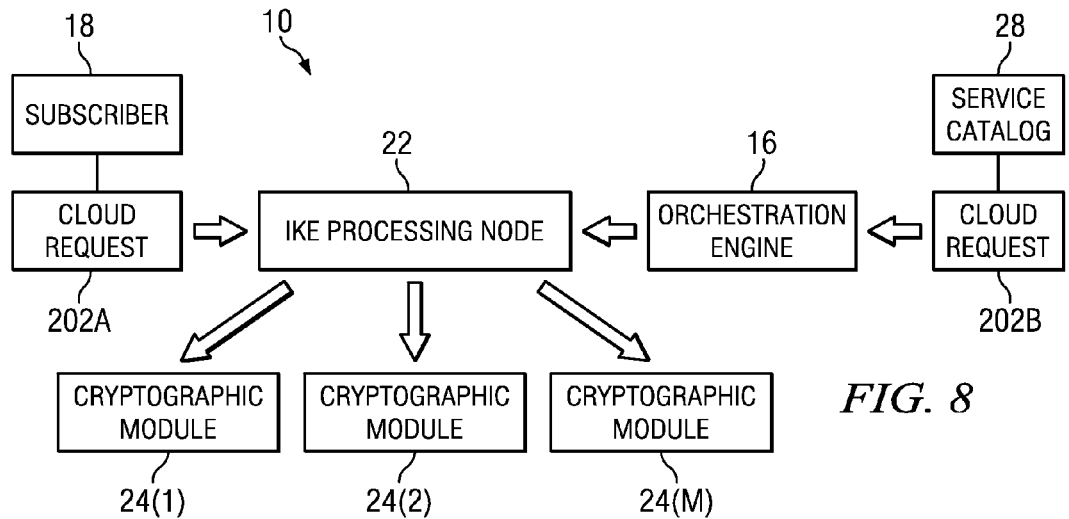
FIG. 8 is a simplified block diagram illustrating details of yet another embodiment of the communication system.

Turning to FIG. 8, FIG. 8 is a simplified block diagram illustrating another example embodiment of communication system 10. Subscriber 18 may send cloud request 202A including request for cloud capability set 26. In various embodiments, cloud request 202A may comprise ISAKMP packet 140, with cloud capabilities listed in attribute value field 174. IKE processing node 22 may inform orchestration engine 16 that subscriber 18 has initiated VPN tunnel 20. In one embodiment, orchestration engine 16 may interact with service catalog 28 to generate cloud request 202B, which may list authorized cloud capabilities in its respective attribute value field. The authorized cloud capabilities may be derived from subscriber 18's SLA with cloud service provider 29.

In various embodiments, IKE processing node 22 may compare the cloud capabilities in cloud request 202A with the authorized list of cloud capabilities in cloud request 202B. A match may be found if the cloud capabilities in cloud request 202A are a subset of the authorized list of cloud capabilities in cloud request 202B. The subset may include substantially all cloud capabilities listed in cloud request 202B. If a match is found, IKE processing node 22 may offload VPN tunnel 20 to one or more cryptographic modules 24(1)-24(M). Otherwise, the request may be denied altogether. In some embodiments, if a match is not found, IKE processing node 22 may create VPN tunnel 20, but provide only those cloud capabilities that match with one or more of the authorized list of cloud capabilities in cloud request 202B.

Figure 9:
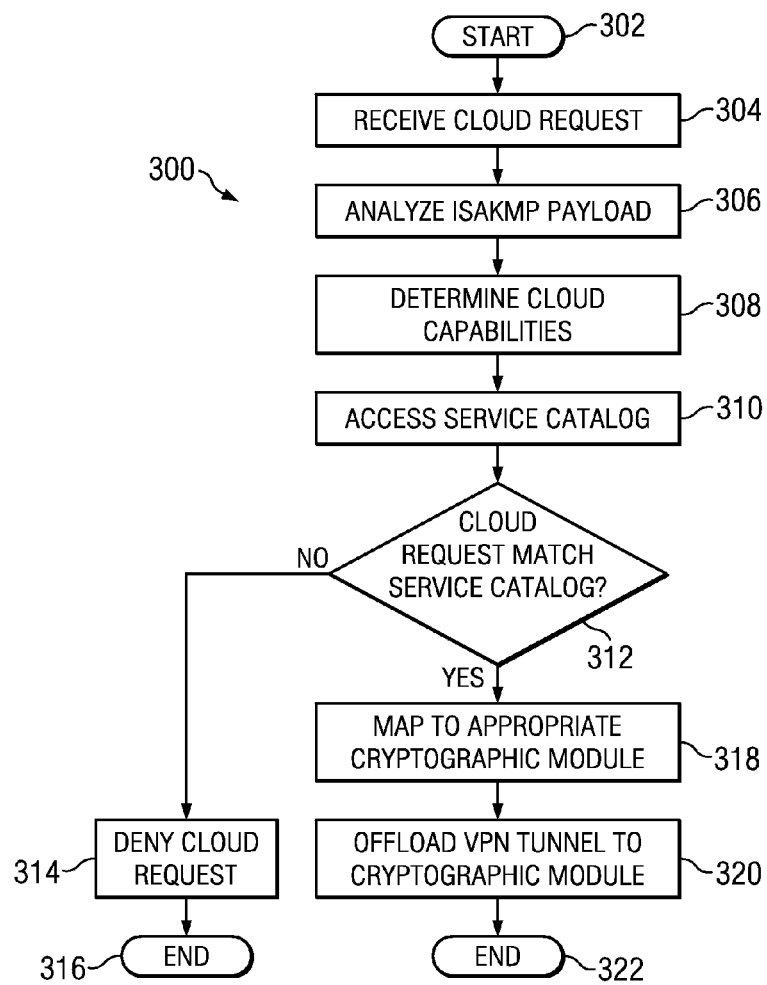
FIG. 9 is a simplified flow diagram illustrating example operational activities that may be associated with embodiments of the communication system.

Turning to FIG. 9, FIG. 9 is a simplified flow diagram illustrating example operational activities that may be associated with embodiments of communication system 10. Operations 300 begin at 302, when communication system 10 is activated. At 304, cloud request 202 is received by IKE processing node 22. In various embodiments, cloud request 202 may comprise ISAKMP packet 140, with cloud capabilities listed in attribute value field 174. At 306, IKE processing node 22 may analyze the ISAKMP payload (e.g., cloud services payload). At 308, IKE processing node 22 may determine the requested cloud capabilities from the ISAKMP payload.

At 310, service catalog 28 may be accessed. In some embodiments, IKE processing node 22 may directly access service catalog 28. In other embodiments, IKE processing node 22 may access service catalog 28 through orchestration engine 16. In yet other embodiments, orchestration engine 16 may access service catalog 28 and identify authorized cloud capabilities. At 312, cloud capabilities in cloud request 202 may be matched with authorized cloud capabilities from service catalog 28.

If a match is not found (e.g., cloud capabilities in cloud request 202 are not listed in service catalog 28), IKE processing node 22 may deny cloud request 202 at 314. In some embodiments, IKE processing node 22 may deny only those cloud capabilities that are not listed in service catalog 28, and allow the rest. The operations may thereupon end at 316. If a match is found (e.g., cloud capabilities in cloud request 202 is a subset of authorized cloud capabilities from service catalog 28), IKE processing node 22 may map VPN tunnel 20 to appropriate cryptographic modules 24(1)-24(M) at 318.

At 320, cryptographic modules 24(1)-24(M) may offload VPN tunnel 20 to appropriate cryptographic modules 24(1)-24(M). Thereafter, requested cloud capabilities may be provided by appropriate 24(1)-24(M) over offloaded VPN tunnel 20. In some embodiments, VPN tunnel 20 may be split across more than one cryptographic module 24(1)-24(M). The operations may end at 322, for example, when VPN tunnel 20 is terminated. In some embodiments, operations 310 and 312 may be bypassed, and service catalog 28 may not be checked. For example, cloud request 202 may be received from service catalog 28, in which case, it need not be checked again.

Figure 10A:
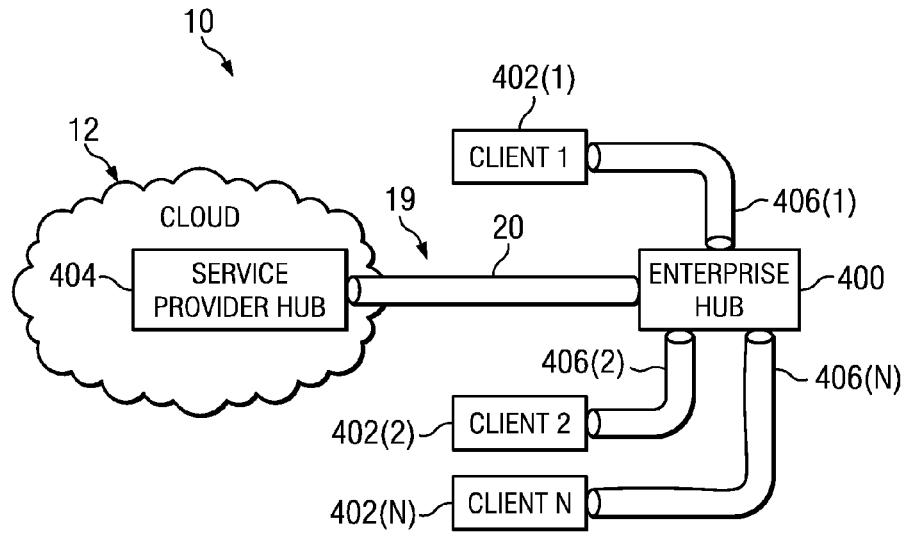
FIGS. 10A and 10B are simplified block diagrams illustrating yet another embodiment of the communication system.
Figure 10B:
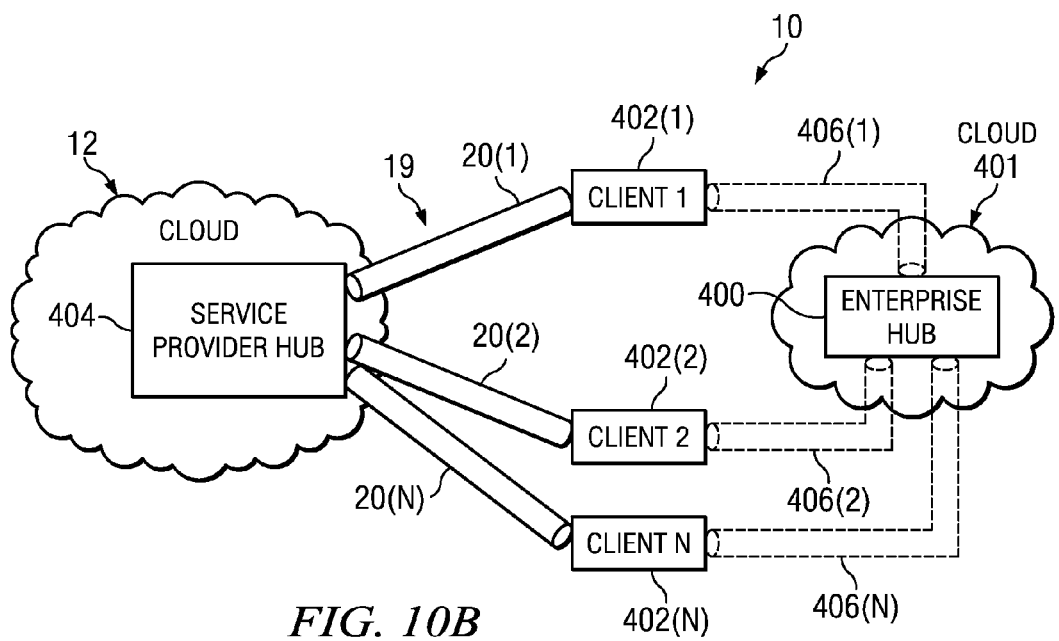

Turning to FIGS. 10A and 10B, FIGS. 10A and 10B are simplified block diagrams illustrating another embodiment of communication system 10. Embodiments of communication system 10 may dynamically offload cloud capabilities (e.g., VPN IPsec services) from an enterprise hub 400 in cloud 401 to cloud 12 in the network to enable elastic services. In various embodiments, cloud 401 may be an enterprise network, a private cloud, a community cloud, or other similar types of networks or clouds. According to embodiments of communication system 10, enterprise hub 400 may be a gateway to cloud 401. In various embodiments, cloud 12 may be a public cloud, managed by a cloud service provider.

Enterprise hub 400 may maintain a common data and infrastructure available to clients 402(1)-402(N). In various embodiments, enterprise hub 400 may include suitable network elements (e.g., routers, switches, IKE processing nodes, cryptographic modules, etc.) to facilitate the operations described herein. In one example embodiment, enterprise hub 400 may deploy IPsec services in a private enterprise cloud. Remote clients (e.g., branch offices) 402(1)-402(N) may securely connect to enterprise hub 400 via respective VPN tunnels 406(1)-406(N).

In specific embodiments, enterprise hub 400 may be configured to monitor traffic load from clients 402(1)-402(N). At any instance in time, enterprise hub 400 may have packets from clients 402(1)-402(N) awaiting transmission, storage, processing (e.g., encrypting/decrypting), etc.; multiple VPN tunnels 406(1)-406(N) may be connected to enterprise hub 400 and communicating packets back and forth from respective clients 402(1)-402(N); and a certain amount (e.g., 50%, 80%, etc.) of infrastructure and bandwidth of enterprise hub 400 may be utilized by communications from and to clients 402(1)-406(N). Enterprise hub 400 may utilize appropriate processors and suitable memory elements to enable handling processing of such communications. As used herein, the term "traffic load" encompasses all such communications handled (e.g., forwarded, transmitted, processed, etc.) by enterprise hub 400.

Enterprise hub 400 may include suitable components for monitoring the traffic load, for example, sensors, network monitors, probes, servers, etc. Enterprise hub 400 may implement any suitable sensor types to monitor traffic load, including Ping, hypertext transfer protocol (HTTP), Windows Management Instrumentation (WMI), Simple Mail Transfer Protocol (SMTP), Post Office Protocol (POP3), Domain Name System (DNS), etc. Enterprise hub 400 may analyze traffic load using any suitable analysis method, including Simple Network Management Protocol (SNMP), NetFlow, packet sniffing, etc. In addition, enterprise hub 400 may include terminals, computers, display monitors, and other peripheral interfaces to enable management of communication therethrough.

According to embodiments of the present disclosure, enterprise hub 400 may be configured to detect instances when traffic load exceeds or falls below predetermined thresholds. In one embodiment, a first threshold (e.g., predetermined number of tunnels, or predetermined encrypt/decrypt throughput, etc.) may be set for excessive traffic loads. A second threshold may be set for moderate (or low) traffic loads. The first and second thresholds may be set by a network administrator according to suitable policy rules applicable to the enterprise. In other cases, the first and second thresholds may be set by the operational configuration settings and/or limitations of the various components included in enterprise hub 400. Any suitable scheme may be used to set the first and second thresholds.

In some embodiments, enterprise hub 400 may be configured to handle typical (e.g., moderate) traffic loads. The cloud service provider of cloud 12 may be contracted (e.g., through an appropriate SLA) to enable cloud 12 to handle peak traffic load, or spikes in traffic loads. Enterprise hub 400 may thereby become a subscriber of services from cloud 12, using VPN tunnel 20 to a service provider hub 404. Service provider hub 404 may be a counterpart of enterprise hub 400. In various embodiments, service provider hub 404 may comprise components that are identical to, substantially similar to, or somewhat similar to, enterprise hub 400. In addition, service provider hub 404 may be configured to handle similar communication with multiple enterprises through corresponding VPN tunnels. For example, service provider hub 404 may include suitable network elements (e.g., routers, switches, IKE processing nodes, cryptographic modules, orchestration engine, etc.) to facilitate the operations described herein.

When the first threshold is reached at enterprise hub 400 (e.g., excessive traffic loads detected, enterprise hub 400 may offload tunnels 406(1)-406(N) to service provider hub 404, as illustrated in FIG. 10B. In various embodiments, such offload may be implemented through suitable notifications to one or more clients 402(1)-402(N). Each notification may comprise an ISAKMP packet listing certain information in a notification payload. The information in the notification payload may include: group security associations (SAs) to enable connecting to cloud 12 securely; the identity of service provider hub 404; and a directive to connect to service provider hub 404 using the group SAs. Subsequently, when the traffic load drops lower than the second threshold, enterprise hub 400 may send another notification to clients 402(1)-402(N), including a directive to resume traffic with enterprise hub 400 via respective VPN tunnels 406(1)-406(N). Service provider hub 404 can decrypt the traffic into a VRF and route clear traffic back to enterprise hub 400 via a back-channel.

In some embodiments, enterprise hub 400 may set up VPN tunnel 20 to service provider hub 404 in cloud 12 when the traffic load exceeds the first threshold. Enterprise hub 400 may exchange group SA information and setup group keys suitably with service provider hub 404. Enterprise hub 400 may then send the group SA's and identity of service provider hub 404 to clients 402(1)-402(N) in the notification payload. Clients 402(1)-402(N) may connect directly to service provider hub 404 through separate tunnels 20(1)-20(N) using the group SA information. Service provider hub 404 may associate clients 402(1)-402(N) with the SLA for enterprise hub 400, to enable appropriate billing and accounting. In various scenarios, the cloud service provider may charge the enterprise subscriber on a usage basis. Thus, enterprise hub 400 can offload some of its service load to service provider hub 404.

In some embodiments, VPN tunnels 406(1)-406(N) may continue to be operational even when tunnels 20(1)-20(N) are operational; however, there may be no traffic, or substantially reduced traffic, on VPN tunnels 406(1)-406(N). When the traffic load on enterprise hub 400 drops below the second threshold, enterprise hub 400 can signal clients 402(1)-402(N) to stop encrypting the traffic to service provider hub 404, and instead re-use tunnels 406(1)-406(N) to enterprise hub 400.

Enterprise hub 400, service provider hub 404, and clients 402(1)-402(N) can include suitably configured routers, switches, terminals, servers, and other network elements to facilitate the operations described herein. Enterprise hub 400, service provider hub 404, and clients 402(1)-402(N) may further be equipped with suitable software/firmware as appropriate, and other network management tools to permit network administrators to configure them as desired.

Figure 11:
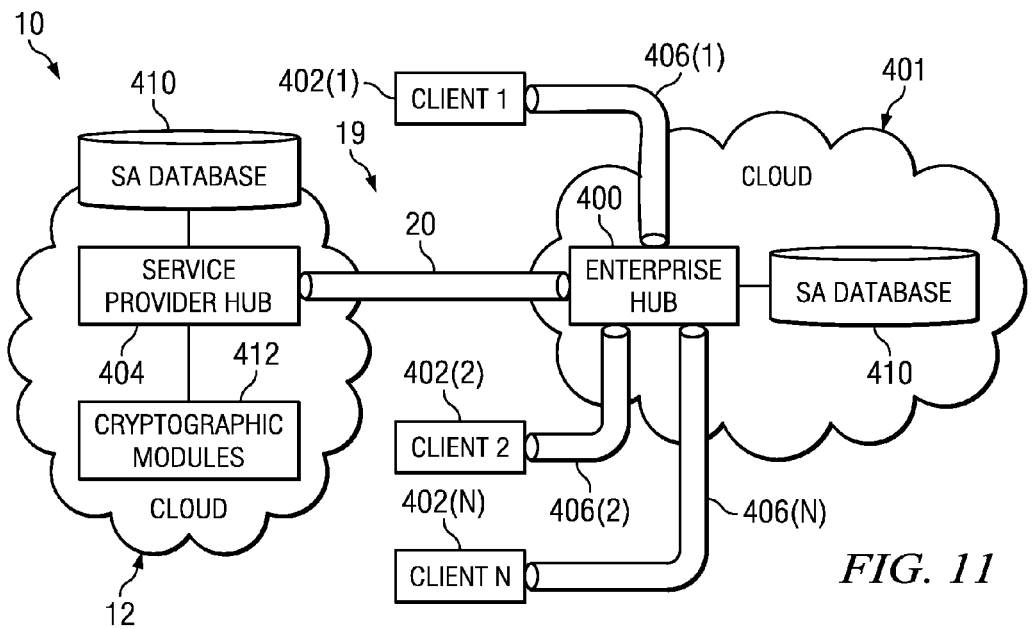
FIG. 11 is a simplified block diagram illustrating yet another embodiment of the communication system.

Turning to FIG. 11, FIG. 11 is a simplified block diagram illustrating yet another embodiment of communication system 10. When the service load on enterprise hub 400 in the network crosses a predetermined threshold, enterprise hub 400 can setup VPN tunnel 20 to service provider hub 404, and exchange a portion of a SA Database (SADB) 410 with service provider hub 404. SADB 410 may comprise SA information pertaining to VPN tunnels 406(1)-406(N) between enterprise hub 400 and respective clients 402(1)-402(N).

To decide what protection is to be provided for an outgoing packet, enterprise hub 400 may use a Security Parameter Index (SPI), and an index to SADB 410, along with the destination address in the packet header to uniquely identify an appropriate SA for that packet. A similar procedure may be performed for an incoming packet, where decryption and verification keys may be gathered from SADB 410. Each VPN tunnel 406(1)-406(N) may be associated with corresponding indices in SADB 410. For example, SADB 410 may hold SPIs, keys, encryption algorithms, and sequence numbers for each VPN tunnel 406(1)-406(N). SADB 100 may comprise any suitable database format, based on particular needs.

After service provider hub 404 obtains a copy of SADB 410 or portion thereof, enterprise hub 400 may offload the cryptographic processing for some of VPN tunnels 406(1)-406(N) to cryptographic modules 412 in cloud 12 via service provider hub 404. Cryptographic modules 412 may be identical, or substantially similar to, cryptographic modules 24(1)-24(M) discussed in connection with FIG. 1. When enterprise hub 400 receives encapsulated traffic (e.g., Encapsulating Security Payload (ESP) traffic; IPsec traffic; etc.) from clients 402(1)-402(N) through respective VPN tunnels 406(1)-406(N), enterprise hub 400 may not decrypt them, instead it may simply forward the encapsulated packets to service provider hub 404 over VPN tunnel 20.

Because service provider hub 404 already has relevant SA information from SADB 410, service provider hub 404 can decrypt encapsulated packets 412 (e.g., using appropriate cryptographic modules 412 and information from SADB 410) and forward clear (e.g., decrypted) packets back to enterprise hub 400 over VPN tunnel 20. Likewise, the operations described herein can be applied in reverse for the traffic to be encrypted back to clients 402(1)-402(N). For example, decrypted traffic may be routed from clients 402(1)-402(N) through enterprise hub 400 to cryptographic modules 412 via service provider hub 404. Cryptographic modules 412 may encrypt the traffic and forward them on to enterprise hub 400 over VPN tunnel 20. Thus, enterprise hub 400 can offload some of its cryptographic processing load to cloud 12 during peak load times. Clients 402(1)-402(N) may not be aware of any changes to the traffic processing and may simply continue to send encrypted (e.g., IPsec) traffic to enterprise hub 400 over respective VPN tunnels 406(1)-406(N).

Figure 12:
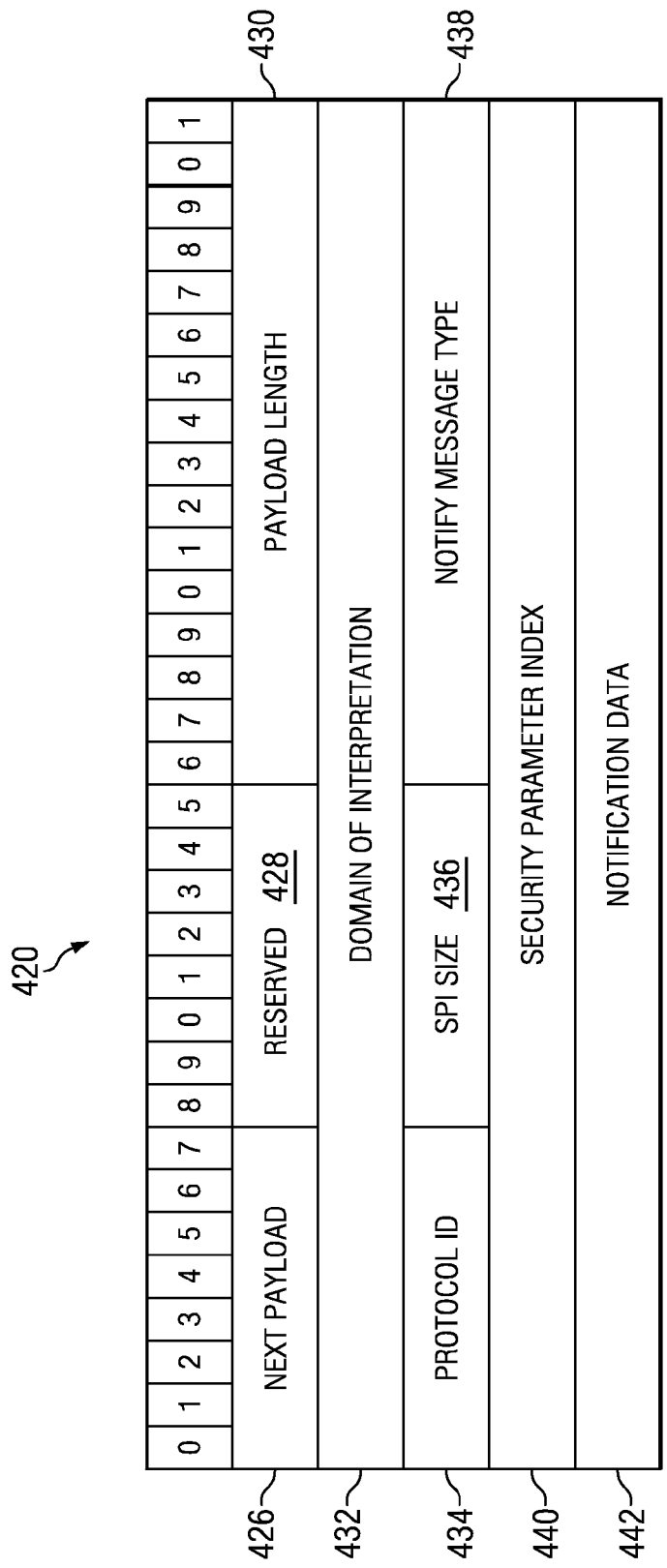
FIG. 12 is a simplified diagram illustrating another example packet that may be associated with embodiments of the communication system.

Turning to FIG. 12, FIG. 12 is a simplified diagram of an example packet according to embodiments of the present disclosure. Notification packet 420 can include a next payload field 426, a reserved field 428, a payload length field 430, a domain of interpretation (DOI) field 432, a protocol ID field 434, a security parameter index (SPI) size field 436, a notify message type field 438, a security parameter index 440, and notification data 442. Notification Packet 420 can contain various informational data, such as error conditions. More than one notification packet 420 may be sent in a single ISAKMP message.

Next payload field 426 indicates the payload type of the next payload in the message and has a length of 1 octet. If the current payload is the last in the message, then next payload field 426 can be 0. Reserved field, which is 1 octet long, is unused, and may be set to 0. Payload length field 430 may be 2 octets long and can indicate the length of the current payload, including the generic payload header.

DOI field 432 may be 4 octets long, and may identify the domain of interpretation under which the notification is taking place. In general, for ISAKMP, DOI field 432 may be set to 0, and for IPsec, DOI field 432 may be set to 1. Protocol ID field 434 may specify the protocol identifier for the current notification. Examples include ISAKMP, IPSEC ESP, IPSEC AH, etc. SPI size field 436 may specify the length in octets of the SPI defined by the protocol ID.

Notify message type field 438 may specify the type of notification message. Notification information can be error messages specifying why an SA could not be established; or status data that a process managing an SA database wishes to communicate with a peer process; etc. Some values (e.g., 1-8191) for notify message type field 438 may be predefined and/or reserved. Some other values (e.g., 8192-16383) are set aside for private use by the ISAKMP standards. According to various embodiments, values set aside for private use may be utilized to exchange cloud notification messages. Example values and corresponding information include: 9001=Group SA information; 9002=service provider hub 404 information; 9002=Send traffic to service provide hub 404; 9003=Resume traffic to enterprise hub 400; etc.

In various embodiments, enterprise hub 400 and/or service provider hub 404 may send appropriate notification packets 420 to each other and to clients 402(1)-402(N) to establish respective tunnels 20(1)-20(N), or 406(1)-406(N) as the case may be. Information about the action to be taken, and/or other SA group information, etc. may be provided in notify message type field 438 as appropriate. Network elements at clients 402(1)-402(N) and enterprise hub 400 may be suitably configured to interpret/analyze notification packet 420 and take action appropriately.

Figure 13:
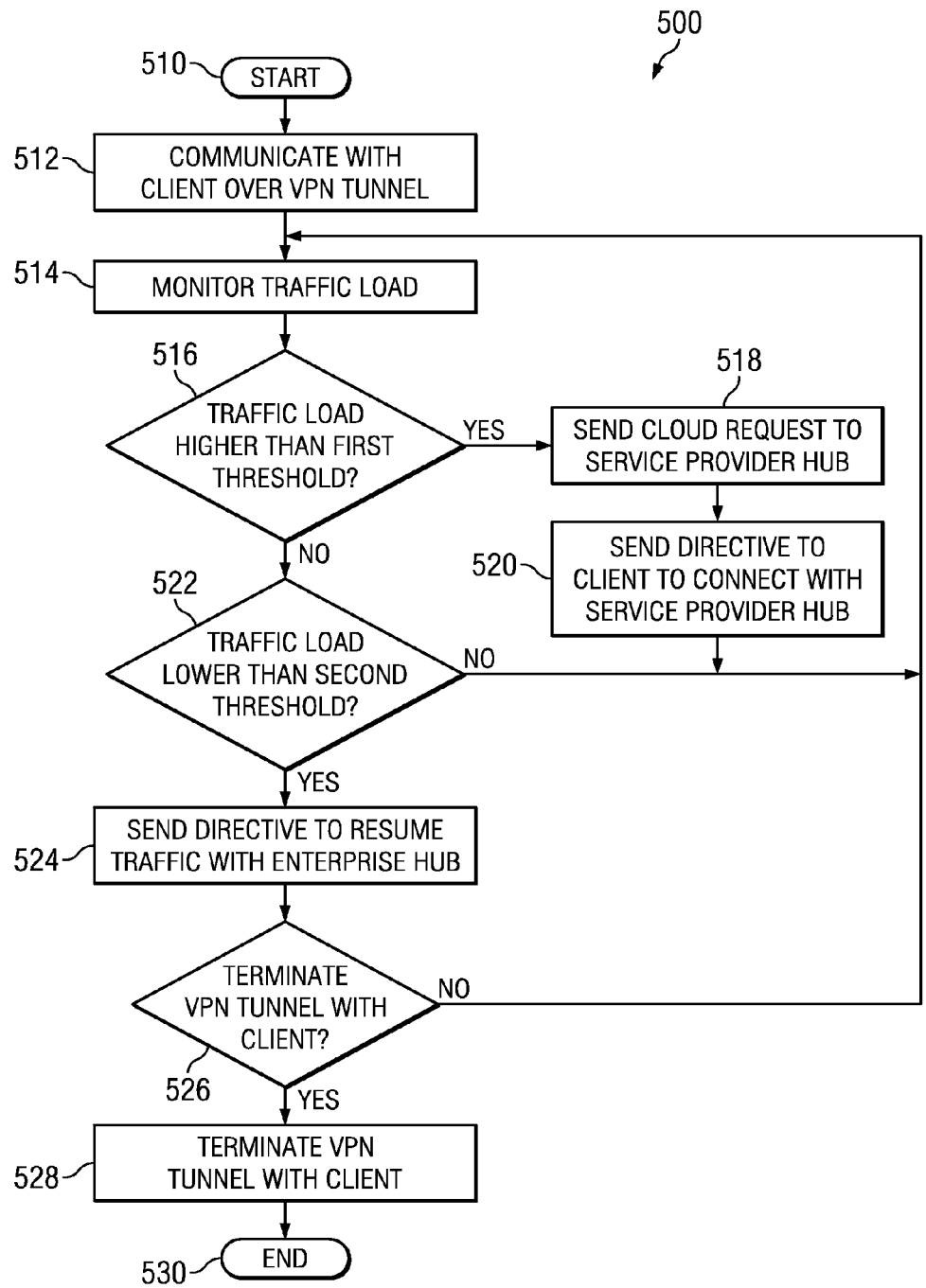
FIG. 13 is a simplified flow diagram illustrating example operational activities that may be associated with embodiments of the communication system.

Turning to FIG. 13, FIG. 13 is a simplified flow diagram illustrating example operational steps that may be associated with embodiments of the present disclosure. Operations 500 start at 502 when communication system 10 is activated. At 512, enterprise hub 400 may communicate with client 402 over VPN tunnel 406. At 514, enterprise hub 400 may monitor its traffic load. At 516, enterprise hub 400 may determine if the traffic load is higher than the first threshold (e.g., excessive traffic load). If the traffic load is higher than the first threshold, enterprise hub 400 may send a cloud request to service provider hub 404 over VPN tunnel 20 requesting certain cloud capabilities at 518. Enterprise hub 400 may also send a notification to client 402 with directive to connect with service provider hub 404. Thereafter, enterprise hub 400 may continue to monitor the traffic load at 514.

If the traffic load is not higher than the first threshold at 516, enterprise hub 400 may check if the traffic load is lower than the second threshold (e.g., moderate traffic) at 522. If the traffic load is lower than the second threshold, enterprise hub 400 may send another notification to client 402 with a directive to resume traffic with enterprise hub 400 at 524. If the traffic load is not lower than the second threshold (e.g., the traffic load continues to be high, but not higher than the first threshold), enterprise hub 400 may continue to service some clients (and not others), and monitor traffic at 514.

At 526, enterprise hub 400 may determine whether client 402 is seeking to terminate VPN tunnel 406. If not, enterprise hub 400 continues to monitor the traffic at 514. Otherwise, enterprise hub 400 may terminate VPN tunnel 406 with client 402 at 528. In some embodiments, enterprise hub 400 may also terminate VPN tunnel 20 with service provider 404. The operations may end at 530.

Figure 14:
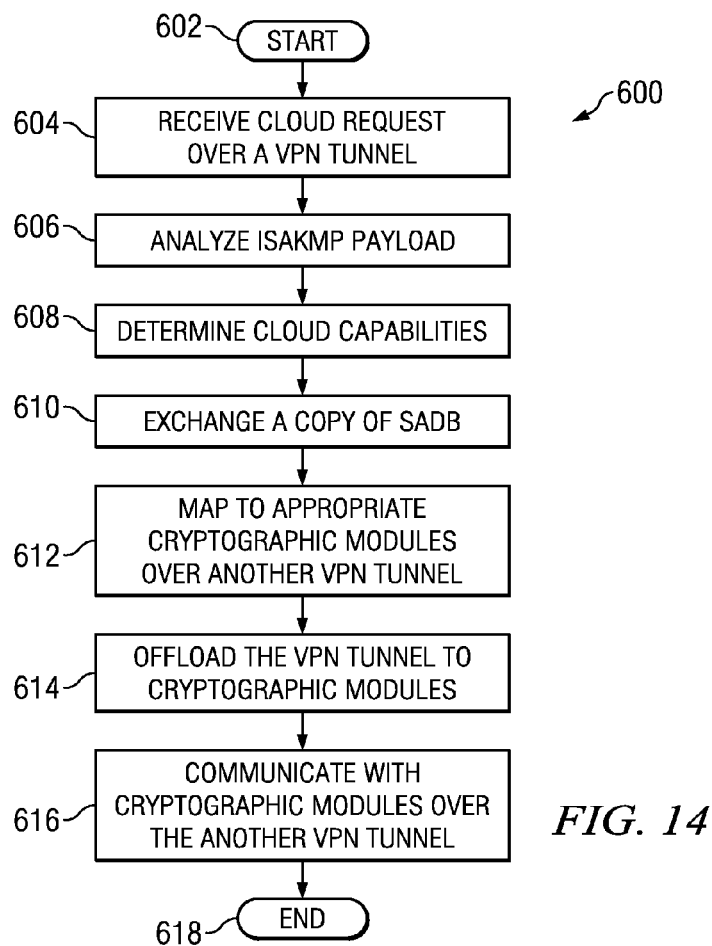
FIG. 14 is a simplified flow diagram illustrating further example operational activities that may be associated with embodiments of the communication system.

Turning to FIG. 14, FIG. 14 is a simplified flow diagram illustrating example operational steps that may be associated with embodiments of the present disclosure. Operations 600 may start at 602, when communication system 10 is activated. At 604, enterprise hub 400 may receive a cloud request over a VPN tunnel (e.g., 406) from client 402. At 606, enterprise hub 400 may analyze the ISAKMP payload. At 608, enterprise hub 400 may determine the requested cloud capabilities from the ISAKMP payload. At 610, enterprise hub 400 may exchange a copy of SADB 410 with service provider hub 404. At 612, enterprise hub 400 may map the requested cloud capabilities to appropriate cryptographic modules 412 over another VPN tunnel (e.g., 20) through service provider hub 404. At 614, enterprise hub 400 may offload VPN tunnel 406 to cryptographic modules 412. At 616, enterprise hub 400 may communicate with cryptographic modules 412 over VPN tunnel 20.

For example, enterprise hub 400 may forward encrypted packets from client 402 to cryptographic modules 412. Using information from SADB 410, service provider hub 404 may facilitate decrypting the packets with cryptographic modules 412. Service provider hub 404 may forward the decrypted packets to enterprise hub 400 over VPN tunnel 20. Similarly, enterprise hub 400 may forward clear packets from client 402 to cryptographic modules 412. Using information from SADB 410, service provider hub 404 may facilitate encrypting the packets with cryptographic modules 412. Service provider hub 404 may forward the encrypted packets to enterprise hub 400 over VPN tunnel 20. Enterprise hub 400 may thus offload cryptographic capabilities to cloud 12. The operations may end at 618.

In example embodiments, at least some portions of the activities outlined herein may be implemented in non-transitory logic (i.e., software) provisioned in, for example, nodes embodying various elements of communication system 10. This can include one or more instances of IKE processing node 22 and/or cryptographic modules 24(1)-24(M) being provisioned in various locations of the network. In some embodiments, one or more of these features may be implemented in hardware, provided external to these elements, or consolidated in any appropriate manner to achieve the intended functionality. IKE processing node 22 and/or cryptographic modules 24(1)-24(M) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, components of communication system 10 described and shown herein may also include suitable interfaces for receiving, transmitting, and/or otherwise communicating data or information in a network environment. Additionally, some of the processors and memory associated with the various nodes may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 206) can store data used for the operations described herein. This includes the memory element being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 204) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components in communication system 10 can include one or more memory elements (e.g., memory element 206) for storing information to be used in achieving operations as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more nodes. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of nodes. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a request for a cloud capability set during an Internet Key Exchange (IKE) negotiation associated with a virtual private network (VPN) tunnel between a subscriber and a cloud, wherein the cloud capability set comprises a plurality of cloud capabilities;
   selecting a cryptographic module from a plurality of cryptographic modules located in the cloud, wherein different cryptographic modules support different cloud capability sets, wherein the selected cryptographic module can support the requested cloud capability set;
   mapping the request to the selected cryptographic module that can support the cloud capability set;
   offloading the VPN tunnel to the selected cryptographic module for processing flows over the VPN tunnel according to the request;
   selecting another cryptographic module if the selected cryptographic module cannot support at least one of the cloud capabilities in the cloud capability set, wherein the selected cryptographic modules can collectively support the plurality of cloud capabilities in the cloud capability set; and
   splitting the VPN tunnel between the selected cryptographic modules.

2. The method of claim 1, further comprising:
   receiving another request for another cloud capability set during another IKE negotiation associated with another VPN tunnel between another subscriber and the cloud, wherein the another cloud capability set is different from the cloud capability set;

selecting another cryptographic module from the plurality of cryptographic modules, wherein the another cryptographic module can support the another cloud capability set;

mapping the another request to the selected another cryptographic module; and offloading the another VPN tunnel to the selected another cryptographic module for processing flows over the another VPN tunnel according to the another request.

3. The method of claim 1, wherein the request comprises an Internet Security Association and Key Management Protocol (ISAKMP) packet listing the one or more cloud capabilities in a private payload.

4. The method of claim 1, wherein the request is received from a service catalog comprising authorized cloud capabilities derived from a service level agreement (SLA) between the subscriber and a cloud service provider managing the cloud.

5. The method of claim 1, wherein the request is received from the subscriber.

6. The method of claim 5, wherein the request is compared with a service catalog comprising authorized cloud capabilities derived from a SLA between the subscriber and a cloud service provider managing the cloud, the method further comprising:

denying the request if at least one cloud capability in the cloud capability set does not match any of the authorized cloud capabilities.

7. The method of claim 1, wherein each cloud capability is a selected one of a group of cloud capabilities, the group consisting of:

(a) a capability to support different multicast encryption schemes, (b) a capability to encrypt Layer 2 tunneling protocol (L2TP) version 2, and L2TPv3 tunnels, (c) a capability to encrypt Generic Routing Encapsulation tunnels, (d) a capability to encrypt IPv6 traffic, (e) a capability to provide different quality of service for Internet Protocol security (IPsec), (f) a capability to support different VPN technologies including EzVPN, dynamic multipoint VPN, and group encrypted transport VPN, (g) a capability to support IKEv2, (h) a capability to support mobility including mobile VPN client and home agent/foreign agent, (i) a capability to support Lempel-Ziv-Stac compression before encryption, (j) a capability to support data encryption standards (DES)/Triple DES (3DES)/Advanced Encryption Standard 256, (h) a capability to support hot standby routing protocol, and (k) a capability to support IPsec with network/port address translation.

8. An apparatus, comprising:
a memory configured to store data; and
a processor operable to execute instructions associated with the data, wherein the processor and the memory cooperate, such that the apparatus is configured for:

receiving a request for a cloud capability set during an IKE negotiation associated with a VPN tunnel between a subscriber and a cloud, wherein the cloud capability set comprises a plurality of cloud capabilities;

selecting a cryptographic module from a plurality of cryptographic modules located in the cloud, wherein different cryptographic modules support different cloud capability sets, wherein the selected cryptographic module can support the requested cloud capability set;

mapping the request to the selected cryptographic module that can support the cloud capability set;

offloading the VPN tunnel to the selected cryptographic module for processing flows over the VPN tunnel according to the request;

selecting another cryptographic module if the selected cryptographic module cannot support at least one of the cloud capabilities in the cloud capability set, wherein the selected cryptographic modules can collectively support all the cloud capabilities in the cloud capability set; and splitting the VPN tunnel between the selected cryptographic modules.

9. The apparatus of claim 8, wherein the request comprises an ISAKMP packet listing the one or more cloud capabilities in a private payload.

10. The apparatus of claim 8, wherein the request is received from a service catalog comprising authorized cloud capabilities derived from a service level agreement (SLA) between the subscriber and a cloud service provider managing the cloud.

11. The apparatus of claim 8, wherein the request is received from the subscriber.

12. The apparatus of claim 8, further configured for:
receiving another request for another cloud capability set during another IKE negotiation associated with another VPN tunnel between another subscriber and the cloud, wherein the another cloud capability set is different from the cloud capability set;

selecting another cryptographic module from the plurality of cryptographic modules, wherein the another cryptographic module can support the another cloud capability set;

mapping the another request to the selected another cryptographic module; and offloading the another VPN tunnel to the selected another cryptographic module for processing flows over the another VPN tunnel according to the another request.

13. Logic encoded in non-transitory media that includes code for execution and when executed by a processor is operable to perform operations, comprising:

receiving a request for a cloud capability set during an IKE negotiation associated with a VPN tunnel between a subscriber and a cloud, wherein the cloud capability set comprises a plurality of cloud capabilities;

selecting a cryptographic module from a plurality of cryptographic modules located in the cloud, wherein different cryptographic modules support different cloud capability sets, wherein the selected cryptographic module can support the requested cloud capability set;

mapping the request to the selected cryptographic module that can support the cloud capability set;

offloading the VPN tunnel to the selected cryptographic module for processing flows over the VPN tunnel according to the request;

selecting another cryptographic module if the selected cryptographic module cannot support at least one of the cloud capabilities in the cloud capability set, wherein the selected cryptographic modules can collectively support all the cloud capabilities in the cloud capability set; and splitting the VPN tunnel between the selected cryptographic modules.

14. The logic of claim 13, wherein the request comprises an ISAKMP packet listing the one or more cloud capabilities in a private payload.

15. The logic of claim 13, wherein the request is received from a service catalog comprising authorized cloud capabilities derived from a service level agreement (SLA) between the subscriber and a cloud service provider managing the cloud.

16. The logic of claim 13, wherein the request is received from the subscriber.

17. The logic of claim 13, the operations further comprising:
- receiving another request for another cloud capability set during another IKE negotiation associated with another VPN tunnel between another subscriber and the cloud, wherein the another cloud capability set is different from the cloud capability set;
- selecting another cryptographic module from the plurality of cryptographic modules, wherein the another cryptographic module can support the another cloud capability set;
- mapping the another request to the selected another cryptographic module; and
- offloading the another VPN tunnel to the selected another cryptographic module for processing flows over the another VPN tunnel according to the another request.

18. A method, comprising:
- receiving a first request for a first cloud capability set during a first IKE negotiation associated with a first VPN tunnel between a first subscriber and a cloud, wherein the cloud capability set comprises one or more cloud capabilities;
- receiving a second request for a second cloud capability set during a second IKE negotiation associated with a second VPN tunnel between a second subscriber and the cloud, wherein the second cloud capability set is different from the first cloud capability set;
- selecting a first cryptographic module and a second cryptographic module from a plurality of cryptographic modules located in the cloud, wherein different cryptographic modules support different cloud capability sets, wherein the first cryptographic module can support the first cloud capability set and the second cryptographic module can support the second cloud capability set;
- mapping the first request to the first cryptographic module and the second request to the second cryptographic module;
- offloading the first VPN tunnel to the first cryptographic module and the second VPN tunnel to the second cryptographic module for processing flows over the corresponding first and second VPN tunnels according to the respective first and second requests.

\* \* \* \* \*